(12) United States Patent
Blewett et al.

(10) Patent No.: US 11,310,248 B2
(45) Date of Patent: Apr. 19, 2022

(54) COMPUTER-SECURITY EVENT ANALYSIS

(71) Applicant: CrowdStrike, Inc., Irvine, CA (US)

(72) Inventors: David Blewett, Noblesville, IN (US);
Brian Concannon, Littleton, CO (US);
John Lee, Cleveland, OH (US); Kris Merritt, Highlands Ranch, CO (US);
Andrew Roden, Irvine, CA (US)

(73) Assignee: CrowdStrike, Inc., Irvine, CA (US)

( * ) Notice: Subject to any disclaimer, the term of this patent is extended or adjusted under 35 U.S.C. 154(b) by 473 days.

(21) Appl. No.: 16/281,277

(22) Filed: Feb. 21, 2019

(65) Prior Publication Data

US 2019/0268361 A1 Aug. 29, 2019

Related U.S. Application Data

(60) Provisional application No. 62/634,408, filed on Feb. 23, 2018.

(51) Int. Cl.
*H04L 12/00* (2006.01)
*H04L 29/06* (2006.01)
(Continued)

(52) U.S. Cl.
CPC .......... *H04L 63/1425* (2013.01); *G06F 9/451* (2018.02); *G06F 16/248* (2019.01);
(Continued)

(58) Field of Classification Search
CPC ...... G06F 16/248; G06F 40/205; G06F 9/451; G06F 21/55; H04L 63/14; H04L 63/1425; H04L 63/1416; H04W 12/12
(Continued)

(56) References Cited

U.S. PATENT DOCUMENTS 7,260,844 B1 * 8/2007 Tidwell ................ G06F 21/577
726/22
7,376,969 B1 * 5/2008 Njemanze .............. G06F 21/55
709/224
(Continued)

FOREIGN PATENT DOCUMENTS

GB 2568522 A * 5/2019 .......... G06F 11/3409

OTHER PUBLICATIONS

Office Action for U.S. Appl. No. 16/168,588, dated Oct. 1, 2020, Nguyen, "Identification Process for Suspicious Activity Patterns Based on Ancestry Relationship", 23 Pages.
(Continued)

*Primary Examiner* — Frantz Coby
(74) *Attorney, Agent, or Firm* — Lee & Hayes, P.C.

(57) ABSTRACT

Example techniques herein filter and classify security-relevant events from monitored computing devices. A control unit can receive event records of various types, each event record associated with a monitored device. The control unit can provide, for each event record matching a corresponding pattern of a pattern set associated with the respective event type, a respective match record. Each match record can include an identifier of the corresponding pattern and data of the respective event record. The control unit can provide, for each match record satisfying a corresponding condition of a condition set, a respective candidate record including a tag associated with the corresponding condition. The control unit can provide, for each candidate record satisfying a tag criterion, a result record. Some examples can receive a modification record and use it to provide an updated condition set used for determining candidate records.

20 Claims, 14 Drawing Sheets

(51) Int. Cl.
| | |
|---|---|
| *G06F 9/451* | (2018.01) |
| *G06F 16/248* | (2019.01) |
| *G06F 21/55* | (2013.01) |
| *H04W 12/12* | (2021.01) |
| *G06F 40/205* | (2020.01) |

(52) U.S. Cl.
CPC ............ *G06F 21/55* (2013.01); *G06F 40/205* (2020.01); *H04L 63/14* (2013.01); *H04L 63/1416* (2013.01); *H04W 12/12* (2013.01)

(58) Field of Classification Search
USPC ...................... 726/23; 709/224; 707/373, 773
See application file for complete search history.

(56) References Cited

U.S. PATENT DOCUMENTS

| | | | | |
|---|---|---|---|---|
| 7,921,459 | B2* | 4/2011 | Houston | H04L 41/0604 726/22 |
| 8,776,241 | B2* | 7/2014 | Zaitsev | H04L 63/1416 726/25 |
| 9,292,695 | B1* | 3/2016 | Bassett | G06F 21/577 |
| 9,401,178 | B2* | 7/2016 | Bentley | G06K 9/00342 |
| 9,406,336 | B2* | 8/2016 | Bose | A63F 13/828 |
| 9,767,279 | B2* | 9/2017 | Hazzani | G06F 21/554 |
| 9,830,951 | B2* | 11/2017 | Bose | A63B 71/06 |
| 9,911,045 | B2* | 3/2018 | Bose | A63F 13/00 |
| 10,104,100 | B1 | 10/2018 | Bogorad | |
| 10,530,790 | B2 | 1/2020 | Shih et al. | |
| 10,884,891 | B2* | 1/2021 | Awad | G06K 9/6284 |
| 2005/0086530 | A1 | 4/2005 | Goddard | |
| 2005/0273857 | A1 | 12/2005 | Freund | |
| 2007/0180107 | A1* | 8/2007 | Newton | H04L 63/1425 709/224 |
| 2007/0209074 | A1 | 9/2007 | Coffman | |
| 2007/0209075 | A1 | 9/2007 | Coffman | |
| 2009/0132340 | A1 | 5/2009 | Demir et al. | |
| 2009/0254970 | A1* | 10/2009 | Agarwal | H04L 63/1425 726/1 |
| 2011/0083180 | A1 | 4/2011 | Mashevsky et al. | |
| 2011/0252032 | A1* | 10/2011 | Fitzgerald | H04L 63/20 707/737 |
| 2011/0320816 | A1 | 12/2011 | Yao et al. | |
| 2014/0223555 | A1 | 8/2014 | Sanz Hernando et al. | |
| 2014/0317741 | A1 | 10/2014 | Be'ery et al. | |
| 2014/0325682 | A1 | 10/2014 | Turgeman et al. | |
| 2015/0180891 | A1 | 6/2015 | Seward et al. | |
| 2015/0264062 | A1 | 9/2015 | Hagiwara et al. | |
| 2016/0065601 | A1 | 3/2016 | Gong et al. | |
| 2016/0105454 | A1 | 4/2016 | Li et al. | |
| 2016/0125094 | A1 | 5/2016 | Li et al. | |
| 2016/0232032 | A1 | 8/2016 | Azvine et al. | |
| 2016/0308888 | A1 | 10/2016 | Vargas Gonzalez | |
| 2016/0330226 | A1 | 11/2016 | Chen et al. | |
| 2016/0359875 | A1 | 12/2016 | Kim et al. | |
| 2017/0295189 | A1 | 10/2017 | Adir et al. | |
| 2019/0266323 | A1 | 8/2019 | Nguyen et al. | |
| 2019/0266324 | A1 | 8/2019 | Edwards et al. | |
| 2019/0268355 | A1 | 8/2019 | Nisbet et al. | |

OTHER PUBLICATIONS

Office Action for U.S. Appl. No. 16/110,927, dated Nov. 9, 2020, Nisbet, "Cardinality-Based Activity Pattern Detection", 28 pages.
Office Action for U.S. Appl. No. 16/268,334, dated Feb. 10, 2021, Edwards, "Cross-Machine Detection Techniques", 10 pages.
Extended European Search Report dated Jun. 12, 2019 for European Patent Application No. 19158478.8, 7 pages.
Extended European Search Report dated Jun. 13, 2019 for European Patent Application No. 19157857.4, 7 pages.
Extended European Search Report dated Jun. 5, 2019, for European Application No. 19156473.1, 7 pages.
Extended European Search Report dated Jun. 7, 2019 for European Patent Application No. 19159021.5, 7 pages.
"Backward Chaining", Mar. 8, 2010, retrieved on Feb. 15, 2019 from <<http://pyke.sourceforge.net/logic_programming/rules/backward_chaining.html>>, 5 pages.
"Meet SIEM Needs with EventLog Analyzer", Jul. 10, 2017, retrieved on Sep. 27, 2017 from <<http://web.archive.org/web/20170710040843/https://www.manageengine.com/products/eventlog/security-information-event-management.html>>, 5 pages.
"Proactive Hunting the Last Line of Defense Against the 'Mega Breach'", Crowdstrike, Whitepaper, Sep. 13, 2016, 22 pages.
"Real-Time Event Correlation Engine", Jul. 10, 2017, etrieved on Sep. 27, 2017 from <<http://web.archive.org/web/20170710063729/https://www.manageengine.com/products/eventlog/event-correlation.html>>, 4 pages.
"Security Information and Event Management", Sep. 21, 2017, retrieved on Sep. 27, 2017 from <<https://en.wikipedia.org/w/index.php?title=Security_information_and_event_management&oldid=801742075>>, Wikipedia, 3 pages.
"Using Pyke", Mar. 10, 2010, retrieved on Feb. 15, 2019 from <<http://pyke.sourceforge.net/using_pyke/index.html>>, 2 pages.
Brown, D., "Understanding Indicators of Attack (IOAs): The Power of Event Stream Processing in CrowdStrike Falcon", Endpoint Protection, Mar. 14, 2017.
"Crowdstrike Falcon Overwatch 24/7 Managed Threat Hunting, Investigation and Response", Apr. 7, 2017, Crowdstrike, 2 pages.
Gallant, Andrew, "Index 1,600,000,000 Keys with Automata and Rust", retrieved on Jul. 19, 2017 from <<http://blog.burntsushi.net/transducers/>>, Nov. 11, 2015, 50 pages.
Wang, Y-M., et al., "Gatekeeper: Monitoring Auto-Start Extensibility Points (ASEPs) for Spyware Management", 2004 Lisa XVIII, Nov. 14-19, 2004, pp. 33-46.
Office Action from the European Patent Office for Appication No. 19159021.5, dated May 29, 2020, a counterpart forieng application of U.S. Appl. No. 16/110,927, 8 pages.
Office Action from the European Patent Office for Application No. 19158478.8, dated Jun. 30, 2020, a counterpart foreign application of U.S. Appl. No. 16/268,334, 5 pages.
Office Action for U.S. Appl. No. 16/110,927, dated Jun. 19, 2020, Nisbet, "Cardinality-Based Activity Pattern Detection", 25 pages.
Extended European Search Report dated Aug. 20, 2021 for European Patent Application No. 21173472.8, 8 pages.
Office Action for U.S. Appl. No. 16/168,588, dated Jul. 19, 2021, Nguyen, "Identification Process for Suspicious Activity Patterns Based on Ancestry Relationship", 19 Pages.

\* cited by examiner

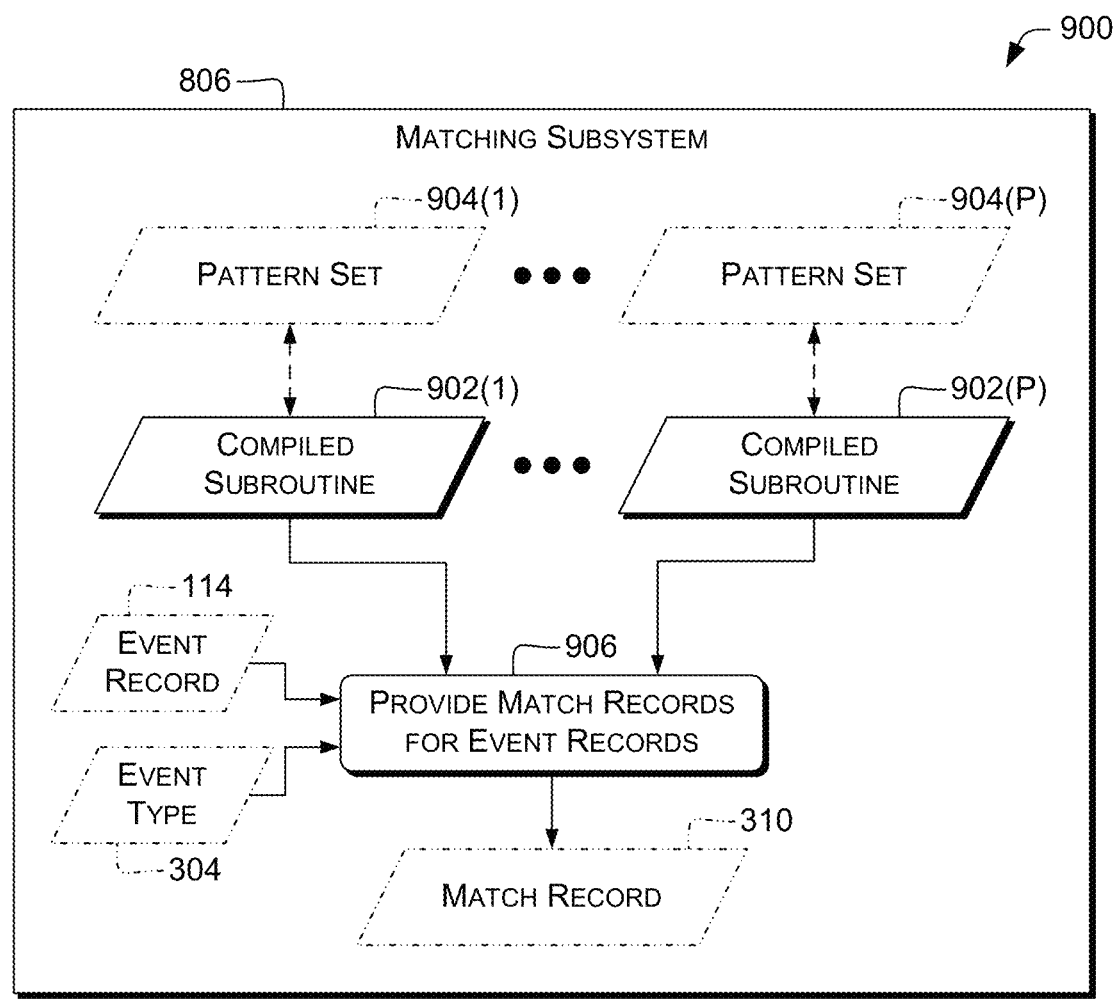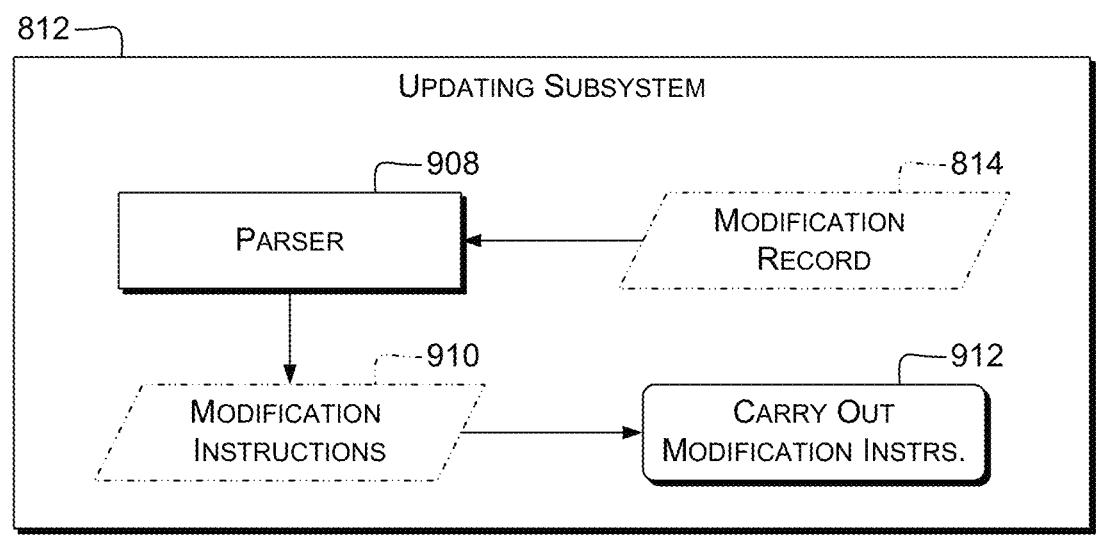
FIG. 9

COMPUTER-SECURITY EVENT ANALYSIS

CROSS-REFERENCE TO RELATED APPLICATION

This application is a nonprovisional application of, and claims priority to and the benefit of, U.S. Patent Application Ser. No. 62/634,408, filed Feb. 23, 2018, and entitled "Computer Security," the entirety of which is incorporated herein by reference.

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" is a general term used to refer to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). An increasing number of attacks also involve direct interaction between attackers and a target computer system, e.g., login using stolen credentials or malware-introduced backdoors. Moreover, attacks may involve concurrent activity across thousands of computers. Detecting and responding to such attacks can be very time-consuming and resource-intensive.

BRIEF DESCRIPTION OF THE DRAWINGS

The detailed description is described with reference to the accompanying figures, in which the use of the same reference numbers in different figures indicates similar or identical items or features. The attached drawings are for purposes of illustration and are not necessarily to scale. For brevity of illustration, an arrow beginning with a diamond connects a first component or operation (at the diamond end) to at least one second component or operation that is or can be included in the first component or operation in at least one example.

FIG. 9 illustrates components of an example event-handling system, and related data items.

DETAILED DESCRIPTION

Overview

Figure 1:
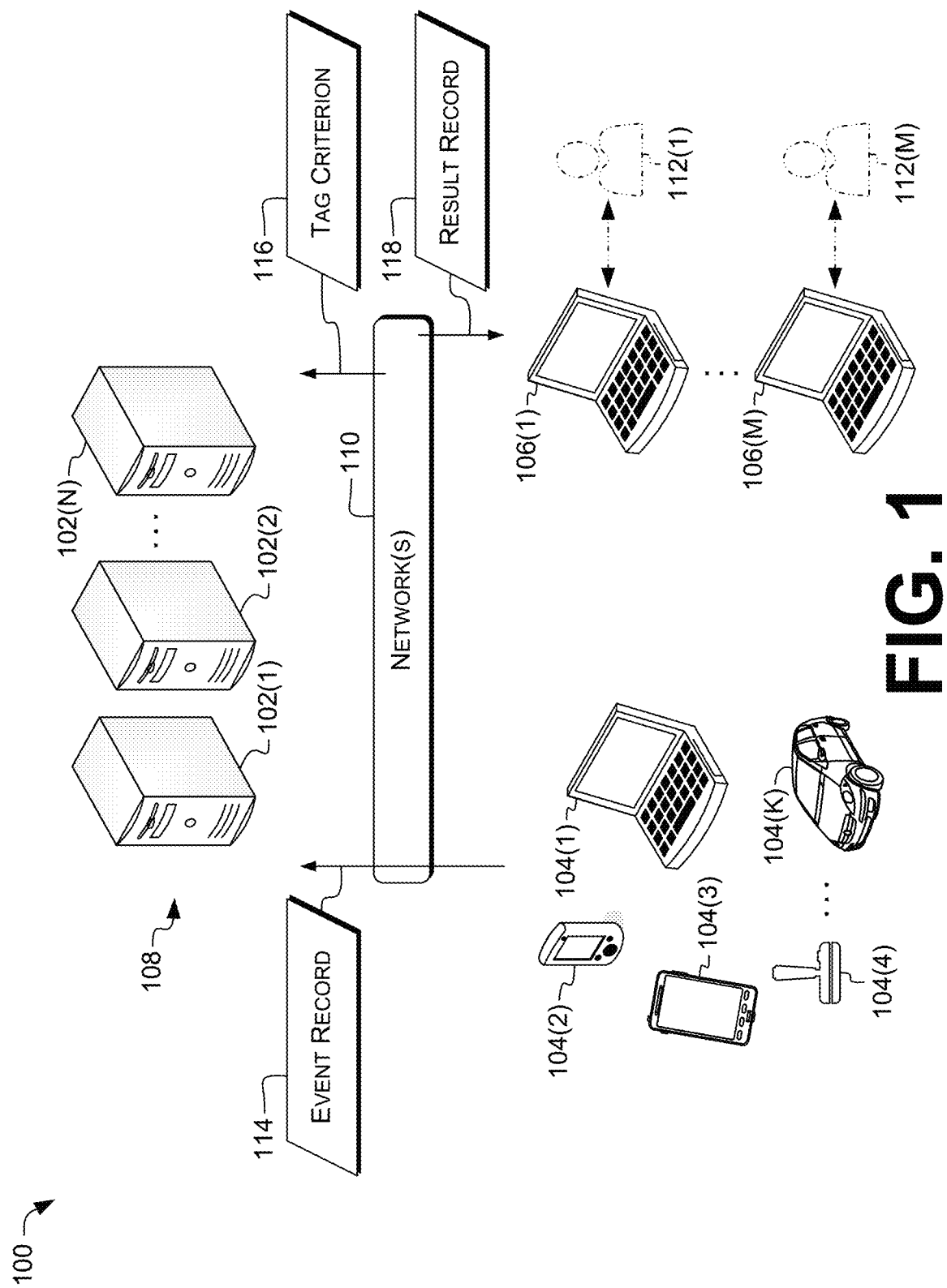
FIG. 1 is a block diagram depicting example scenarios for handling events, e.g., for collecting, processing, and reporting event data.

Some examples herein relate to responding to cyberattacks, e.g., by detecting security-relevant events, distinguishing attack events from legitimate events, such as system administration, and reporting events that may be indicative of attacks. These activities are referred to individually or collectively as "event handling" for purposes of brevity. Also for brevity and ease of understanding, as used herein, "suspicious events" refers to events determined using techniques described herein as being possibly indicative of attacks. The term "suspicious" does not imply or require that any moral, ethical, or legal judgment be brought to bear in determining suspicious events.

Some examples relate to receiving heterogeneous event stream(s) indicating activities of system components such as processes or files. Some examples filter those event stream(s) through multiple layers of filtering, e.g., a higher-volume, lower-flexibility layer followed by a lower-volume, higher-flexibility layer. Such multilayer filtering can provide security analysts or end users or customers of security services with real-time or near-real-time information regarding suspicious events. Some examples can permit security analysts to investigate and respond to attacks while those attacks are still in progress, possibly defeating the attackers.

In some examples, each of one or more monitored computing devices is equipped with a security agent (e.g., a service or daemon process) to monitor events on that device. Those monitored computing devices may be in communication with devices of a security service system, e.g., implemented using cloud technology. The security service system can filter and analyze events, and present only suspicious events to security analysts. This can, e.g., reduce the volume of events from thousands per second to a few per minute, permitting analysts to triage and research the suspicious events. Some examples perform this filtering in a computationally efficient way, e.g., by restricting the amount of processing performed at the highest-volume portion of the event stream.

Example techniques described herein may refer to processes and modules running on a computing device, e.g., in the context of detecting activities of malware or of attackers. However, the techniques may also apply to other non-malicious software, processes, or other system components. For example, techniques described herein can be used in determining which processes are accessing particular files or other system resources, or in analyzing causes of excess resource usage by processes. Accordingly, techniques discussed herein for filtering events may be used by, among others, anti-malware security researchers, white-hat vulnerability researchers, or other analysts of event streams. Examples of system components can include data streams, e.g., including data stored in, e.g., a file, a disk boot sector or partition root sector, or a block of memory; processes; operating systems; operating-system instances under a hypervisor; files; memory regions; central processing units (CPUs) or cores thereof; network interfaces or other communications devices; peripherals; fixed or removable storage devices; or add-in cards.

Various entities, configurations of electronic devices, and methods for handling events, e.g., for stream-analysis or malware-detection applications, are described herein. While many examples described herein relate to servers and other non-consumer electronic devices, other types of electronic devices can be used, e.g., as discussed with reference to FIG. 1. References throughout this document to "users" can refer to human users or to other entities interacting with a computing system. Moreover, throughout this document, various conditions, tests, criteria, and patterns are discussed. This disclosure specifically envisions examples in which, within any given type of criterion (e.g., within patterns of a pattern set or conditions of a condition set), the criterion is deemed to be satisfied if at least one, a majority, or all of the criteria of that type are satisfied (e.g., if only one pattern of a pattern set matches, if a majority of patterns of the pattern set match, or if all patterns of the pattern set match).

The following are incorporated herein by reference in their entirety: U.S. Pat. Nos. 9,043,903 and 9,798,882.

Illustrative Environments

FIG. 1 shows an example scenario 100 in which examples of event-handling systems can operate or in which event-handling methods such as those described herein can be performed. Scenario 100 can be deployed, e.g., for responding to cyber-attacks, e.g., by detecting, analyzing, or mitigating those attacks. Illustrated devices or components of scenario 100 include computing device(s) 102(1)-102(N) (individually or collectively referred to herein with reference 102) (N≥1), computing devices 104(1)-104(K) (similarly referred to with reference 104) (K≥1), and computing devices 106(1)-106(M) (similarly referred to with reference 106) (M≥1). In some examples, any of N, K, and M may be the same as, or different from, any other of those.

In the illustrated example, computing device(s) 102(1)-102(N) can be computing nodes in a cluster computing system 108 ("computing cluster" or "cluster") having several discrete computing nodes (device(s) 102) that work together to accomplish a computing task assigned to the cluster 108 as a whole. In some examples, computing device(s) 104 or 106 can be clients of cluster 108 and can submit computing tasks to cluster 108 or receive task results from cluster 108. Computing devices 102(1)-102(N) in cluster 108 can, e.g., share resources, balance load, increase performance, or provide fail-over support or redundancy.

Some cluster-based systems can have all or a portion of the cluster deployed in the cloud, e.g., using a cloud service such as GOOGLE CLOUD PLATFORM. Cloud computing allows for computing resources to be provided as services rather than a deliverable product. For example, in a cloud-computing environment, resources such as computing power, software, information, or network connectivity are provided (for example, through a rental agreement) over a network, such as the Internet. Cloud resources can be provided for internal use within an organization or for sale to outside customers. In some examples, computer security service providers can operate cluster 108, or can operate or subscribe to a cloud service providing computing resources.

In other examples, cluster 108 or computing device(s) 102 can be deployed as a computing appliance operated by or on behalf of a particular user, group, or organization. For example, a corporation may deploy an appliance per office site, per division, or for the company as a whole. In some examples, the computing appliance can be a central, single-tenant, on-premises appliance. In some examples, a computing appliance can be used to implement at least one of the computing device(s) 102 in addition to, or instead of, a cloud service.

In some examples, computing devices 102, 104, and 106 can intercommunicate to participate in or carry out event handling as described herein. For example, computing devices 104 can be monitored computing devices. Monitored computing devices 104 can include or run security agents that provide events to computing devices 102. Computing devices 102 can process those events, and provide suspicious events to computing devices 106.

Different devices or types of computing devices 102 and 104 can have different needs or ways of interacting with cluster 108. For example, cluster 108 can interact with discrete request/response communications to computing devices 104 to determine additional data. Additionally or alternatively, computing devices 104 can be data sources (e.g., running security agents) and can interact with cluster 108 with discrete or ongoing transmissions of event records to be handled. For example, a data source in a personal computing device 104(1) can provide to cluster 108 data of newly-installed executable files, e.g., after installation and before execution of those files; of newly-launched processes; or of writes to system files.

In some examples, computing devices 102, 104, or 106 can communicate with each other or with other computing devices via one or more network(s) 110. For example, network(s) 110 can include public networks such as the Internet, private networks such as an institutional or personal intranet, or combination(s) of private and public networks. Communications between computing devices 102, 104, or 106 via network(s) 110 can be structured, e.g., according to defined application programming interfaces (APIs). For example, data can be retrieved via network(s) 110, e.g., using a Hypertext Transfer Protocol (HTTP) request such as a GET to a Web Services or Representational State Transfer (REST) API endpoint. Data can be returned in formats including, but not limited to, Extensible Markup Language (XML); JavaScript Object Notation (JSON); Hypertext Markup Language (HTML); spreadsheet formats such as Comma-Separated Value (CSV); archive formats such as gzip; or others. Remote Procedure Call (RPC) APIs such as OSF DCE RPC or D-Bus, or other types of APIs, can additionally or alternatively be used for network communications. In some examples, communications can be implemented using Web techniques such as AJAX, Comet, or Web Sockets.

In some examples, computing devices 106(1)-106(M) interact with entities 112(1)-112(M) (shown in phantom) (individually or collectively, entities 112) (M≥1). Entities 112 can be security analysts working for a security service, in some examples. The number of entities 112 is the same as the number of computing devices 106 in this example; in other examples, those numbers are different. Additionally or alternatively, entities 112 can include systems, devices, parties such as users, or other features with which computing devices 106 can interact. For brevity, examples of entity 112 are discussed herein with reference to users of a computing system; however, these examples are not limiting. In some examples, a computing device 106 is operated by an entity 112, e.g., a security analyst, who provides search queries via computing device 106 to cluster 108. Cluster 108 then returns search results to computing device 106 for presentation to entity 112 via a user interface. Examples of such processes are discussed in more detail below with reference to at least FIGS. 3-13.

In some examples, event-handling algorithms can be performed on a computing device 102. Search results can be presented on such computing devices or on other computing devices (e.g., computing devices 104 or 106) having one or more input devices, such as a physical keyboard, a soft keyboard, a touch screen, a touch pad, microphone(s), or camera(s). In some examples, functions described herein can be shared between one or more computing device(s) 102 and one or more computing device(s) 104 or 106. For example, event filtering can be performed by computing device(s) 102 alone, or by any combination of at least two of a computing device 102, 104, 106 in a coordinated manner.

In the illustrated example, computing devices 104 transmit event records 114 to computing devices 102. Computing devices 102 filter and otherwise handle the event records 114 to determine suspicious events. For example, computing devices 102 can apply a "tag" to each event record 114 of a suspicious event. A computing device 106 can transmit a tag criterion (or criteria) 116 to computing devices 102. Computing devices 102 can respond to computing device 106 with result record(s) 118 corresponding to event record(s) 114 having tags satisfying the tag criterion 116.

In some examples, any of computing device(s) 102, 104, or 106 can include, but are not limited to, server computers or blade servers such as Web servers, map/reduce servers or other computation engines, or network-attached-storage units (e.g., 102(1)), laptop computers, thin clients, terminals, or other mobile computers (e.g., 104(1)), wearable computers such as smart watches or biometric or medical sensors, implanted computing devices such as biometric or medical sensors, computer navigation client computing devices, satellite-based navigation system devices including global positioning system (GPS) devices or other satellite-based navigation system devices, personal data assistants (PDAs), or other specialized portable electronic devices (e.g., 104 (2)), tablet computers, tablet hybrid computers, smartphones, mobile phones, mobile phone-tablet hybrid devices, or other telecommunication devices (e.g., 104(3)), portable or console-based gaming devices or other entertainment devices such as network-enabled televisions, set-top boxes, media players, cameras, or personal video recorders (PVRs) (e.g., 104(4), depicted as a joystick), automotive computers such as vehicle control systems, vehicle security systems, or electronic keys for vehicles (e.g., 104(K), depicted as an automobile), desktop computers, or integrated components for inclusion in computing devices, appliances, or other computing device(s) configured to participate in or carry out event handling or other operations described herein, e.g., for event-analysis purposes, e.g., in support of malware or attack detection.

Network(s) 110 can include any type of wired or wireless network, including but not limited to personal area networks (PANs) such as BLUETOOTH and ZIGBEE, local area networks (LANs) such as Ethernet and WI-FI, wide area networks (WANs), satellite networks, cable networks, WiMAX networks, cellular mobile communications networks (e.g., 3G, 4G, and so forth) or any combination thereof. Network(s) 110 can utilize communications protocols, such as, for example, packet-based or datagram-based protocols such as Internet Protocol (IP), Transmission Control Protocol (TCP), User Datagram Protocol (UDP), other types of protocols, or combinations or IP-based evolutions thereof. Moreover, network(s) 110 can also include a number of devices that facilitate network communications or form a hardware infrastructure for the networks, such as switches, routers, gateways, access points, firewalls, base stations, wireless access points (WAPs), repeaters, backbone devices, and the like. Network(s) 110 can also include devices that facilitate communications between computing devices 102 or 104 using bus protocols of various topologies, e.g., crossbar switches, INFINIBAND switches, or FIBRE CHANNEL switches or hubs.

As noted above, network(s) 110 can include public network(s) or private network(s). Example private networks can include isolated networks not connected with other networks, such as MODBUS, FIELDBUS, or Industrial Ethernet networks used internally to factories for machine automation. Private networks can also include networks connected to the Internet or other public network(s) via network address translation (NAT) devices, firewalls, network intrusion detection systems, or other devices that restrict or control the types of network packets permitted to flow between the private network and the public network(s).

Illustrative Configurations and Data Structures

Figure 2:
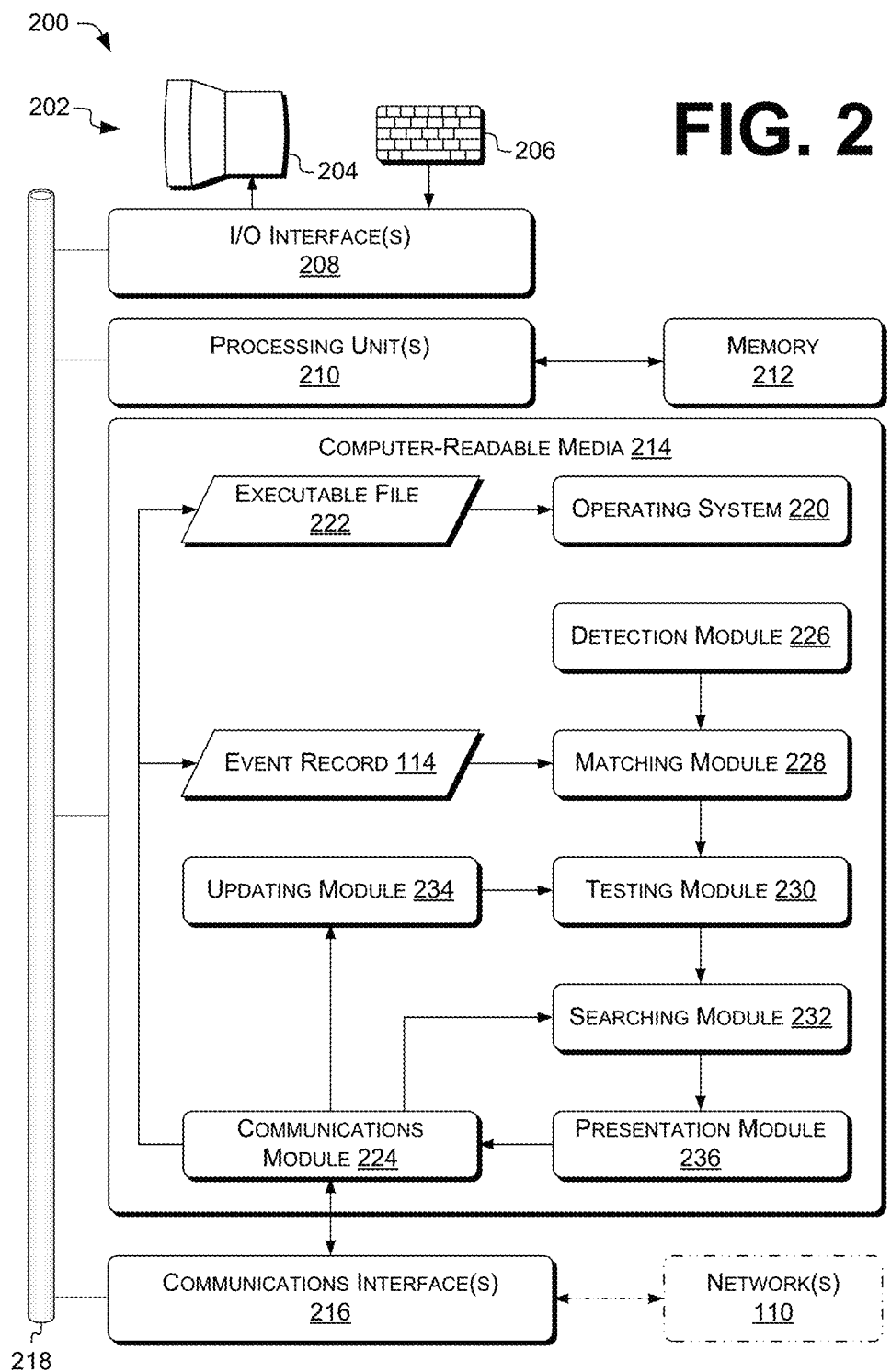
FIG. 2 is a block diagram depicting an example computing device configured to participate in event handling.

FIG. 2 is an illustrative diagram that shows example components of a computing device 200, which can represent computing device(s) 102, 104, or 106. Computing device 200 can be, implement, include, or be included in, a system, device, or apparatus, or portion thereof, for handling events as described herein.

Computing device 200 can include or be connected to a user interface (UI) 202. In some examples, UI 202 can be configured to permit a user, e.g., entity 112, to retrieve result records 118 or other information about suspicious events, or to control or otherwise interact with cluster 108 or computing devices 102 therein. Accordingly, actions such as presenting information of or corresponding to a result record 118 to entity 112 can be taken via UI 202.

In some examples, UI 202 can include one or more output devices configured for communication to a user or to another computing device 200. Output devices can be integral or peripheral to computing device 200. Examples of output devices can include a display 204, a printer, audio speakers, beepers, or other audio output devices, a vibration motor, linear vibrator, or other haptic output device, and the like. Display 204 can include an organic light-emitting-diode (OLED) display, a liquid-crystal display (LCD), a cathode-ray tube (CRT), or another type of visual display. Display 204 can be a component of a touchscreen, or can include a touchscreen.

UI 202 can include one or more input devices, which can be integral or peripheral to computing device 200. The input devices can include user-operable input device 206 (depicted as a keyboard), or device(s) configured for input from other computing device(s) 200. Examples of input devices can include, e.g., a keyboard, keypad, a mouse, a trackball, a pen sensor or smart pen, a light pen or light gun, a game controller such as a joystick or game pad, a voice input device such as a microphone, voice-recognition device, or speech-recognition device, a touch input device such as a touchscreen, a gestural or motion input device such as a depth camera, a grip sensor, an accelerometer, another haptic input, a visual input device such as one or more cameras or image sensors, and the like. User queries can be received, e.g., from entity 112, via UI 202.

Computing device 200 can further include one or more input/output (I/O) interface(s) 208 to allow computing device 200 to communicate with input, output, or I/O devices. Examples of such devices can include components of UI 202 such as described above. Other examples of such devices can include power meters, accelerometers, and other devices for measuring properties of entity 112, computing device 200, or another computing device 102, 104, or 106. Input data, e.g., of user inputs on user-operable input device 206, can be received via I/O interface(s) 208. Output data, e.g., of UI screens, can be provided via I/O interface(s) 208 to display 204, e.g., for viewing by entity 112.

The computing device 200 can include one or more processing unit(s) 210. In some examples, processing unit(s) 210 can include or be connected to a memory 212, e.g., a main RAM or a cache. Processing units 210 can be operably coupled to the I/O interface 208 and to at least one computer-readable media 214 (CRM), e.g., at least one tangible non-transitory computer-readable medium or other computer storage medium. In some examples, CRM 214 can store instructions executable by the processing unit(s) 210, or instructions executable by external processing units such as by an external CPU or other processor. Any of these instructions are referred to herein as computer-executable instructions or processor-executable instructions.

Processing unit(s) 210 can be or include one or more single-core processors, multi-core processors, CPUs, graphics processing units (GPUs), general-purpose GPUs (GPGPUs), or hardware logic components configured, e.g., via specialized programming from modules or APIs, to perform functions described herein. For example, processing units 210 can be or include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Digital Signal Processors (DSPs), and other types of customizable processors. For example, processing unit(s) 210 can represent a hybrid device, such as a device from ALTERA or XILINX that includes a CPU core embedded in an FPGA fabric. These or other hardware logic components can operate independently or, in some instances, can be driven by a CPU.

In some examples, at least one computing device 102, 104, or 106, FIG. 1, can include a plurality of processing units 210 of multiple types. For example, the processing units 210 in computing device 102(N) can be a combination of one or more GPGPUs and one or more FPGAs. Different processing units 210 can have different execution models, e.g., as is the case for GPUs and CPUs. In some examples at least one processing unit 210, e.g., a CPU, graphics processing unit (GPU), or hardware logic device, can be incorporated in computing device 200, while in some examples at least one processing unit 210, e.g., one or more of a CPU, GPU, or hardware logic device, can be external to computing device 200.

Computer-readable media described herein, e.g., CRM 214, includes computer storage media and communication media. Computer storage media includes tangible, non-transitory storage units such as volatile memory, nonvolatile memory, or other persistent or auxiliary computer storage media, removable and non-removable computer storage media implemented in any method or technology for storage of information such as computer-readable instructions, data structures, program modules, or other data. Computer storage media includes tangible or physical forms of media included in a device or hardware component that is part of a device or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or memories, storage, devices, or storage media that can be used to store and maintain information for access by processing unit(s) 210 or other components of computing device 200.

In contrast to computer storage media, communication media can embody computer-readable instructions, data structures, program modules, or other data in a modulated data signal, such as a carrier wave, or other transmission mechanism. As defined herein, computer storage media does not include communication media.

The computing device 200 can also include a communications interface 216, which can include a transceiver device such as a network interface controller (NIC) to send and receive communications over a network 110 (shown in phantom), e.g., as discussed above. Communications interface 216 can include any number of network, bus, or memory interfaces, in any combination, whether packaged together or separately. In some examples, communications interface 216 can include a memory bus internal to a particular computing device 200, transmitting or providing data via communications interface 216 can include storing the data in memory 212 or CRM 214, and receiving via communications interface 216 can include retrieving data from memory 212 or CRM 214.

In some examples, the communications interface 216 can include, but is not limited to, a transceiver for any wired or wireless network, such as those described herein with reference to FIG. 1. The communications interface 216 can include a wired I/O interface, such as a serial interface, a Universal Serial Bus (USB) interface, or other wired interfaces. The communications interface 216 can additionally or alternatively include at least one user-interface device or UI 202, at least one bus such as a memory bus or local bus, at least one memory interface, or at least one hardwired interface such as a 0-20 mA control line.

In some examples, the processing unit(s) 210 can access data on the CRM 214 via a bus 218. I/O interface 208 and communications interface 216 can also communicate with processing unit(s) 210 via bus 218. For example, communications interface 216 can exchange data with UI 202 via bus 218 and I/O interface(s) 208. Bus 218 can include, e.g., at least one of a system bus, a data bus, an address bus, a Peripheral Component Interconnect (PCI) Express (PCIe) bus, a PCI bus, a Mini-PCI bus, any variety of local, peripheral, or independent buses, or any combination thereof.

In some examples, CRM 214 can store instructions of an operating system (OS) 220. CRM 214 can additionally or alternatively store at least one executable file 222, which can be an example of a system component. In some examples, OS 220 can cause processing unit(s) 210 to load computer-executable instructions from executable file 222 into a RAM or other high-speed memory, e.g., memory 212, or to otherwise prepare computer-executable instructions from executable file 222 for execution by processing unit(s) 210. Some examples, e.g., bare-metal embedded-systems configurations, can include a loader but not an OS 220. OS 220 can additionally or alternatively load other types of files, e.g., data files.

In some examples, a "control unit" as described herein includes processing unit(s) 210. A control unit can also include, if required, memory 212, CRM 214, or portions of either or both of those. For example, a control unit can include a CPU or DSP and a computer storage medium or other tangible, non-transitory CRM storing instructions executable by that CPU or DSP to cause that CPU or DSP to perform functions described herein. Additionally or alternatively, a control unit can include an ASIC, FPGA, or other logic device(s) wired (e.g., physically, or via blown fuses or logic-cell configuration data) to perform functions described herein. In some examples of control units including ASICs or other devices physically configured to perform operations described herein, a control unit does not include computer-readable media storing executable instructions. Accordingly, references herein to computer-executable instructions also refer to wiring or configuration to cause control units that do not use computer-executable instructions to perform the described functions.

Computer-executable instructions or other data stored on CRM 214 can include a communications module 224, a detection module 226, a matching module 228, a testing module 230, a searching module 232, an updating module 234, a presentation module 236, or other modules, programs, or applications that are loadable and executable by processing unit(s) 210. Processing unit(s) 210 can be configured to execute modules of the plurality of modules. For example, the computer-executable instructions stored on the CRM 214 can upon execution configure a computer such as a computing device 200 to perform operations described herein with reference to the modules of the plurality of modules. The modules stored in the CRM 214 can include instructions that, when executed by the one or more processing units 210, cause the one or more processing units 210 to perform operations described below. For example, the computer-executable instructions stored on the CRM 214 can upon execution configure a computer such as a computing device 102 or 104 to perform operations described herein with reference to the OS 220 or the above-listed modules 224-236. In some examples, computer-executable instructions on CRM 214 can additionally or alternatively include instructions of a Web browser, smartphone app or desktop application, background service conducting or monitoring network communications, or instant-messaging client, or can include components of any of those configured to perform functions described herein (e.g., of detection module 226). Such programs or components can invoke or include functions of any of the listed modules.

In some examples not shown, one or more of the processing unit(s) 210 in one of the computing device(s) 102 or 104 can be operably connected to CRM 214 in a different one of the computing device(s) 102 or 104, e.g., via communications interface 216 (discussed below) and network 110. For example, program code to perform steps of flow diagrams herein, e.g., as described herein with reference to modules 226 or 236, can be downloaded from a server, e.g., a computing device 102, to a client, e.g., a computing device 104 or 106 respectively, e.g., via the network 110, and executed by one or more processing unit(s) 210 in that computing device 104 or 106.

In some examples, the OS 220 can include components that enable or direct the computing device 200 to receive data via various inputs (e.g., user controls such as user-operable input device 206, network or communications interfaces such as communications interface 216, devices implementing memory 212, or sensors), and process the data using the processing unit(s) 210 to generate output. The OS 220 can further include one or more components that present the output (e.g., display an image on an electronic display 204, store data in memory 212, or transmit data to another computing device 102, 104, or 106. The OS 220 can enable a user (e.g., entity 112) to interact with the computing device 200 using a UI 202. Additionally, the OS 220 can include components that perform various functions generally associated with an operating system, e.g., storage management and internal-device management. In some examples, the OS 220 or other modules stored in the CRM 214 can be configured to load part or all of one or more pattern sets 306 or condition sets 312, FIG. 3, from CRM 214 into memory 212 or other relatively higher-speed storage for access by processing unit(s) 210.

In various examples, the number of modules can vary higher or lower, and modules of various types can be used in various combinations. For example, functionality described associated with the illustrated modules can be combined to be performed by a fewer number of modules or APIs or can be split and performed by a larger number of modules or APIs. For example, the searching module 232 and the presentation module 236 can be combined in a single module that performs at least some of the example functions described below of those modules, as likewise the communications module 224 and the detection module 226 (e.g., on a monitored computing device 104). In some examples, CRM 214 can include a subset of the above-described modules.

In the illustrated example, detection module 226 can detect events and provide corresponding event records 114. Additionally or alternatively, communications module 224 can receive event records 114 describing events. Matching module 228 can provide match records for respective event records 114 matching a pattern, as discussed herein with reference to operation 308, FIG. 3. Testing module 230 can provide candidate records for respective match records satisfying a condition, as described herein with reference to operation 314. Updating module 234 can update the conditions used by testing module 230, e.g., in response to data received by communications module 224. Searching module 232 can receive a tag criterion from the communications module 224 and determine corresponding result records 118 from among the candidate records, as discussed herein with reference to operation 320. Communications module 224 can provide the result records 118, e.g., to a computing device 106 or a UI 202.

In some examples, the communications module 224 or another module stored in CRM 214, executing at a computing device 104, can be configured to receive event records 114, e.g., via user-operable input device 206, communications interface(s) 216, or a filesystem, and to provide the event records 114 to a computing device 102. In some examples, communications module 224 or presentation module 236, running at a computing device 106, can be configured to transmit queries (tag criteria 116) to a computing device 102, receive responses from computing device 102, and present the responses, e.g., via display 204. In some examples, filtering of events is carried out on computing device(s) 102. In some examples, filtering of events is carried out partly on computing device(s) 102, and partly on at least one of a computing device 104 or a computing device 106. In some examples, event records 114, tag criteria 116, result records 118, or other transmissions described herein can be conducted, e.g., in the form of HTTP requests transmitted via TCP connections. For example, an HTTP request conveying a record, e.g., in a body of the request, can also include a URL parameter, HTTP cookie, or other data carrying identifying information or credentials associated with the record. Result records 118 and other transmissions herein can be conducted in an HTTP response header or body, or other response to a request or unprompted transmission.

In some examples, detection module 226 can include a kernel-level or user-level security agent. In various embodiments, the kernel-level security agent can be installed on the host computing device in the form of a driver. For example, a driver or other implementation of detection module 226 can use hooks or filter drivers, or monitor memory or log files, as discussed below.

In some examples, the kernel-level security agent can operate on computing device 104 as a virtual machine/shadow operating system. The kernel-level security agent loads before the operating system of the host computing device, e.g., very early in the boot-time of the host computing device, by some of the first few dozen instructions in some examples. Pre-boot components of detection module 226 can leverage hardware-provided security features, e.g., firmware signing, although this is not required. By loading early in boot-time, the kernel-level security agent significantly reduces the window in which malware can become active and interfere with operation of the host computing device or run unobserved on the host computing device. In some embodiments, by leveraging hardware-based security features, the agent can also validate the integrity of its computing operations and data and additionally enhance the level of security provided.

In some examples, the detection module 226 can be received from or operable with a security service. Such a security service may be implemented as a cloud of security service devices (referred to herein as a "security service cloud" or a "remote security system"). The security service cloud can, e.g., install the detection module 226 on the computing device 104, receive event records 114 or other notifications of observed events from the detection module 226, perform analysis of data associated with those events, perform healing of the host computing device, or generate configuration updates and provide those updates to the detection module 226. These or other interactions between the kernel-level security agent and the security service cloud can enable a detection loop that defeats the malware update loop of malware developers (also referred to herein as "adversaries"). Also, as used herein, the term "adversaries" includes not only malware developers but also exploit developers, builders and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

In some examples, detection module 226 can include various components, e.g., various software modules. Components can include collectors, filters, routers/dispatchers, or event consumers. Collectors can receive notifications of events (e.g., file writes and launching executables) from host operating system hooks or filter drivers, from user-mode event monitors, or from threads monitoring log files or memory locations. Filters can filter data of these events, e.g., to remove the need to perform further processing on benign events. Routers/dispatchers can provide data from the filters to event consumer(s), such as correlators or actor components. A correlator component notes the fact of the occurrence of the filtered events. An actor component may, for example, gather forensic data associated with an event and provide an event record 114 including the forensic data.

In various embodiments, a collector may register with a hook or filter driver offered by the operating system to receive notifications of the occurrence or non-occurrence of certain events, such as file creates, reads and writes, and loading executables. A collector may monitor locations in memory or log files, or spawn a thread to do so, observing events associated with the log files or memory locations. A collector may observe multiple kinds of activities or data, or each kind may be associated with a different collector. The events observed by the collectors may be specified by a configuration of the detection module 226. In some embodiments, the collectors observe all events on the computing device 104 and the configuration specifies configurable filters for filtering and dispatching those events. In other embodiments, the configuration specifies which collectors should be loaded to observe specific types of events. In yet other embodiments, the configuration both specifies which collectors should be loaded and configurable filters for filtering and dispatching events observed by those collectors.

Additionally or alternatively, the detection module 226 may include user mode collectors to observe events that may not be visible to kernel mode processes. Such events could include, for example, rendering of display graphics for display on a display screen of the computing device 104. To observe these events, the detection module 226 is further configured to load user mode collectors as user-mode modules of the computing device 104. Like the kernel-mode collectors described above, user mode collectors may observe multiple kinds of events or activities, or each kind may be associated with a different user mode collector. The events observed by the user mode collectors may be specified by a configuration of the detection module 226. In some embodiments, the user mode collectors observe all user mode events on the computing device 104 and the configuration specifies configurable filters for filtering and dispatching the events. In other embodiments, the configuration specifies which user mode collectors should be loaded to observe specific types of events. In yet other embodiments, the configuration both specifies which user mode collectors should be loaded and configurable filters for filtering and dispatching those events.

In some examples, the detection module 226 can build and maintain a model representing chains of execution activities and genealogies of processes. This model can be used to track attributes, behaviors, or patterns of processes executing on the computing device 104 and can enable an event consumer to determine when an event should be reported to the matching module 228. Upon determining an occurrence of such an event, the event consumer can perform any or all of: updating the situational model and performing further observation, generating an event record 114 to represent the determination that an event has occurred, notifying the security service cloud of the event (e.g., by transmitting event record 114 to the security service cloud, e.g., in cluster 108), or healing the host computing device by halting execution of a process associated with malicious code or deceiving an adversary associated with the malicious code. In various embodiments, any or all of the observing, filtering, routing/dispatching, and/or utilizing of event consumers may occur in parallel with respect to multiple events.

By detecting events based on chains of execution activities of the host computing device and other data described above, rather than on fixed signatures, the kernel-level security agent is able to better detect processes associated with malicious code. While adversaries can easily change malware to avoid signature-based detection, it is significantly more difficult to avoid detection by an agent that monitors and analyzes events. Cluster 108 or other implementations of matching module 228, testing module 230, or searching module 232, can then process events from multiple computing devices 104 to detect more complex patterns of malicious activity.

Figure 3:
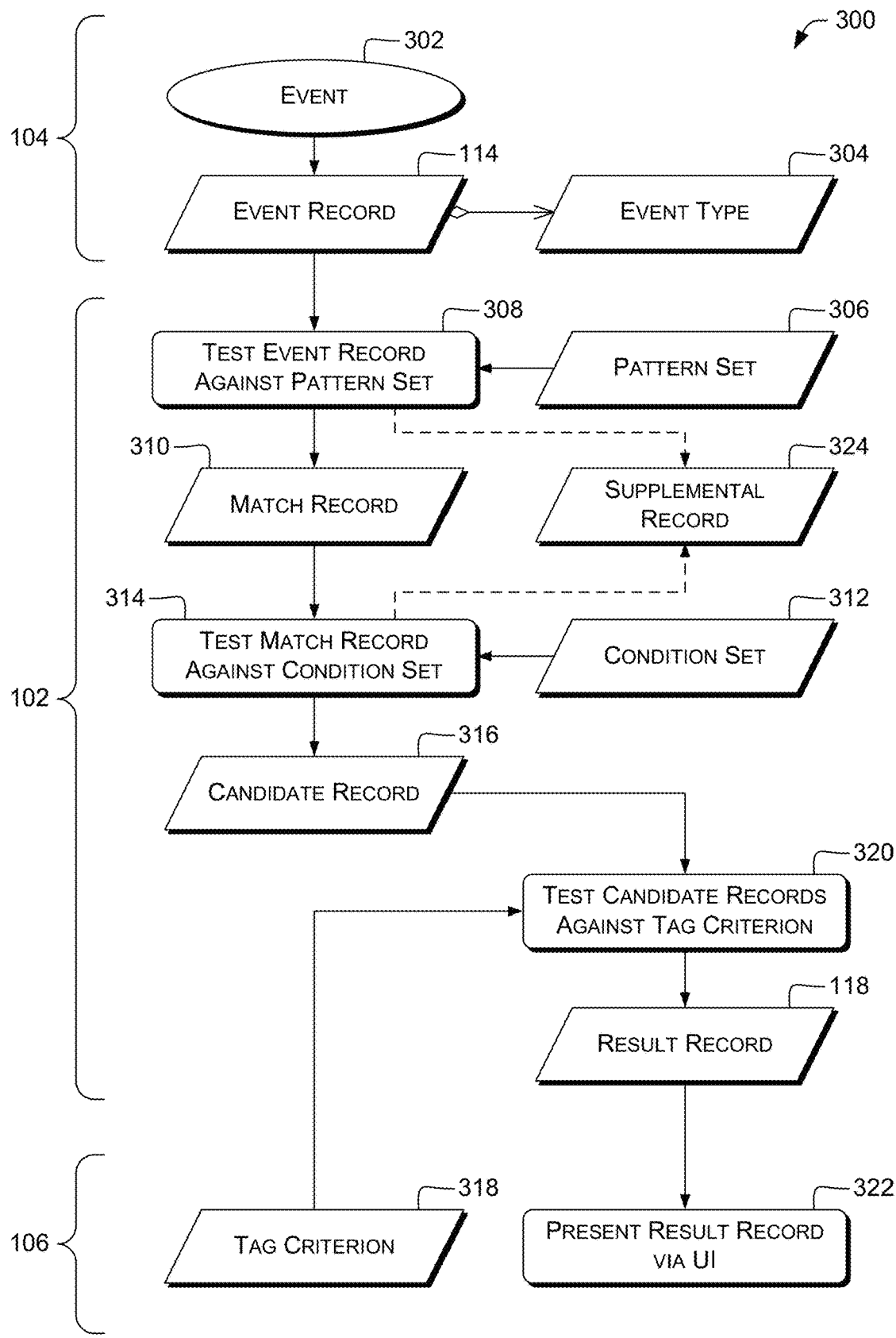
FIG. 3 illustrates components and dataflow involved in an example event-handling system.

FIG. 3 is a diagram 300 illustrating components and dataflow in an example event-handling system. Illustrated data items can be stored in CRM 214, and illustrated operations can be carried out by computing device(s) 200. Portions of FIG. 3 are described with respect to a single event; however, the described operations can be carried out with respect to any number of events. Details of each of these operations are described herein with reference to FIGS. 4-13.

In some examples, detection module 226 running on a computing device 104 detects an event 302. Detection module 226 produces an event record 114 including data describing the event 302. For example, the event record 114 can include an event type 304 of the event 302. Nonlimiting example event types 304 can include, e.g., "process created," "file opened" "network connection established," or "DNS request made."

Throughout this document, an event record 114, or any other record described herein, can include one or more fields, each of which can have a name or other identifier, and each of which can include or be associated with one or more values. For example, event record 114 or other records herein can be represented as ASN.1-defined data structures, GOOGLE protobufs, JSON records, XML documents or subtrees, associative arrays, or other forms of tagged or key-value storage. Examples of fields can include, but are not limited to, timestamps, filenames, filehandles, userids (e.g., Windows SIDs), groupids, process identifiers, session identifiers (e.g., process command lines), command-line histories, universally unique identifiers (UUIDs), operating-system identifiers, e.g., from uname(1), permissions, access-control lists (ACLs), login types (e.g., with or without secure attention sequence), timestamps, blocks of data (e.g., headers or full contents of files or of regions of memory), hashes of data (e.g., of the blocks of data, such as file contents), IP or other network addresses (e.g., of computing device 104 or peers with which it is communicating or is attempting to communicate), network port numbers (e.g., local or remote), identifiers of detection module 226 (e.g., a version number), values from the registry, dotfiles, or other configuration data (e.g., crontab entries), call-stack entries, domain names (e.g., relative or full-qualified, FQDN), names or other identifiers of mutexes, named pipes, or other inter-thread communication or inter-process communication (IPC) mechanisms, or counts (e.g., of VIRUSTOTAL dirty indications).

In some examples, field values associated with an event 302 indicating an action taken or attempted by a process can report the corresponding values before the action, after the action, or both (e.g., filename before or after a rename, or both). In some examples, field values can include the results of applying transform(s) to any of the above, e.g., to smash case or otherwise filter or preprocess the data. In some examples, an event record 114 can include information about a process that is currently running on the computing device 104, or that has previously run on the computing device 104. In some examples, an event record 114 can include information about at least one currently-running process and at least one related process (e.g., still running or already terminated), e.g., a parent process of the currently-running process.

In some examples, at least one event type 304 can be associated with an event 302 that only occurs when a specific operating system is running on the computing device 104 (e.g., WINDOWS-only events or MAC OS X-only events). In some examples, at least one event type 304 can be associated with events 302 that occur on multiple operating systems (e.g., events that can occur on any OS providing a POSIX-compliant API). In some examples, an event type 304 can indicate at least one of the following types of events 302: a user logging on or off, detection module 226 starting up or shutting down, a process being created, a network name being looked up (e.g., via DNS), a network connection being initiated or established (e.g., IPv4 or IPv6), a value in an auto-start extensibility point (ASEP) being created or modified, an executable being created, modified, or deleted, a critical system file being modified, a file of a specific type or extension being created or updated (e.g., based on a database listing the specific type(s) or extension(s) to be monitored), a new scheduled task or daemon being registered or otherwise set up to execute at a future time or on a schedule, or a process making or attempting an access to a portion of a disk, memory, or other system resource not allocated to that process.

In some examples, matching module 228 running on a computing device 102 can access a pattern set 306 associated with the event type. In some examples, at operation 308, matching module 228 can determine a match record 310 associated with the event 302. For example, the matching module 228 can test the event record 114 against the pattern set 306 at operation 308. The matching module 228 can provide the match record 310 in response to the event record 114 matching a corresponding pattern of the pattern set 306.

In some examples, the pattern set 306 can include regular expressions or other conditions to be tested against particular fields of the event record 114. In some examples, conditions can be tested in a case-insensitive or case-sensitive manner. Examples of other conditions are described herein with reference to tests 412. In some examples, regular expression ("regex") testing is performed by a discrete finite automaton (DFA) to provide rapid, deterministic-time indications of whether the event record 114 matches a particular pattern or not. For example, each pattern can include the field name and a regex against which the value of that field should be tested.

In some examples, operation 308 (or a separate operation) can additionally or alternatively include providing a supplemental record 324, as indicated by the dashed arrow. The supplemental record 324 can be or include text or other human-readable information, machine-readable information, or any combination thereof. For example, the supplemental record 324 can be a wiki page or other record editable to record information specific to a set of criteria, e.g., as provided by security analyst(s).

In some examples, pattern set 306 can include one or more supplemental triggers. Each supplemental trigger can include one or more supplemental criteria. Each supplemental criterion can include, e.g., a value equality test, a test for membership of a field's value in a predetermined group, e.g., of hostnames or filenames, a regex test, or another test of a field value as described herein. If event record 114 satisfies all the supplemental criteria of a specific supplemental trigger, an action associated with that supplemental trigger can be taken. For example, the action can include providing the supplemental record 324, e.g., by retrieving the record from a database, or by transmitting a URL associated with the supplemental record 324 to a Web browser for retrieval.

In some examples, some of the supplemental criteria for a supplemental trigger can be marked as optional (or required), and the action associated with that supplemental trigger can be taken even if some optional criteria are not satisfied (or as long as all required criteria are satisfied). In some examples, also indicated by a dashed arrow, supplemental triggers can be additionally or alternatively specified in condition set 312. Operation 314 (or a separate operation) can include providing a supplemental record 324 in response to a match record 310 satisfying the criteria associated with a supplemental trigger of the condition set 312.

In some examples, testing module 230 running on a computing device 102 can access a condition set 312. In some examples, at operation 314, testing module 230 can determine a candidate record 316 associated with the event 302. For example, testing module 230 can determine that the match record 310 satisfies at least one condition of the condition set, and, in response, provide the candidate record 316.

In some examples, pattern set 306 or condition set 312 can be or include one or more blacklists. The blacklists can indicate patterns of activity, system components, or other aspects of events that are or may be indicative of malicious activity. Event records 114 satisfying corresponding criteria in pattern set 306 and condition set 312 can be provided as candidate records 316.

In some examples, presentation module 236 or another module running on a computing device 106 can receive, via UI 202, a tag criterion 318. Presentation module 236 can provide the tag criterion 318 to the computing device 102.

In some examples, at operation 320, searching module 232 running on computing device 102 can access one or more candidate records 316 for respective events 302. Searching module 232 can provide result records 118 for those candidate records 316 having tags satisfying the tag criterion 318. Searching module 232 can provide the result records 118 to the computing device 106.

In some examples, at operation 322, presentation module 236 can present the result records 118 via the UI 202. In this way, for example, a security analyst (entity 112) using a computing device 106 can search events and view search results corresponding to suspicious events.

In some examples, at least one match record 310, at least one candidate record 316, or at least one result record 118 can include a classification. The classification can include, e.g., a bitmask, attribute list, or other representation of categories to which a particular event or related system component belongs, or tags with which the particular event or system component is associated, as determined as described herein. For example, a classification can include a Boolean value indicating whether or not the event or system component is suspicious (e.g., associated with malware), or an enumerated value indicating with which of several categories the event or system component is associated (e.g., "benign," "virus," or "spyware"). The classification can additionally or alternatively include one or more confidence values or other values indicating the likelihood of a classification, e.g., a "spyware" value of 0.42 indicating a 42% likelihood that a particular newly-created process is spyware. In an example, the classification can include multiple confidence values for respective categories of malware or other fields (e.g., "spyware=0.42; worm=0.05"). In some examples, result records 118 and data therein can be used by a security analyst in triaging or analyzing events.

Illustrative Processes

Figure 4A:
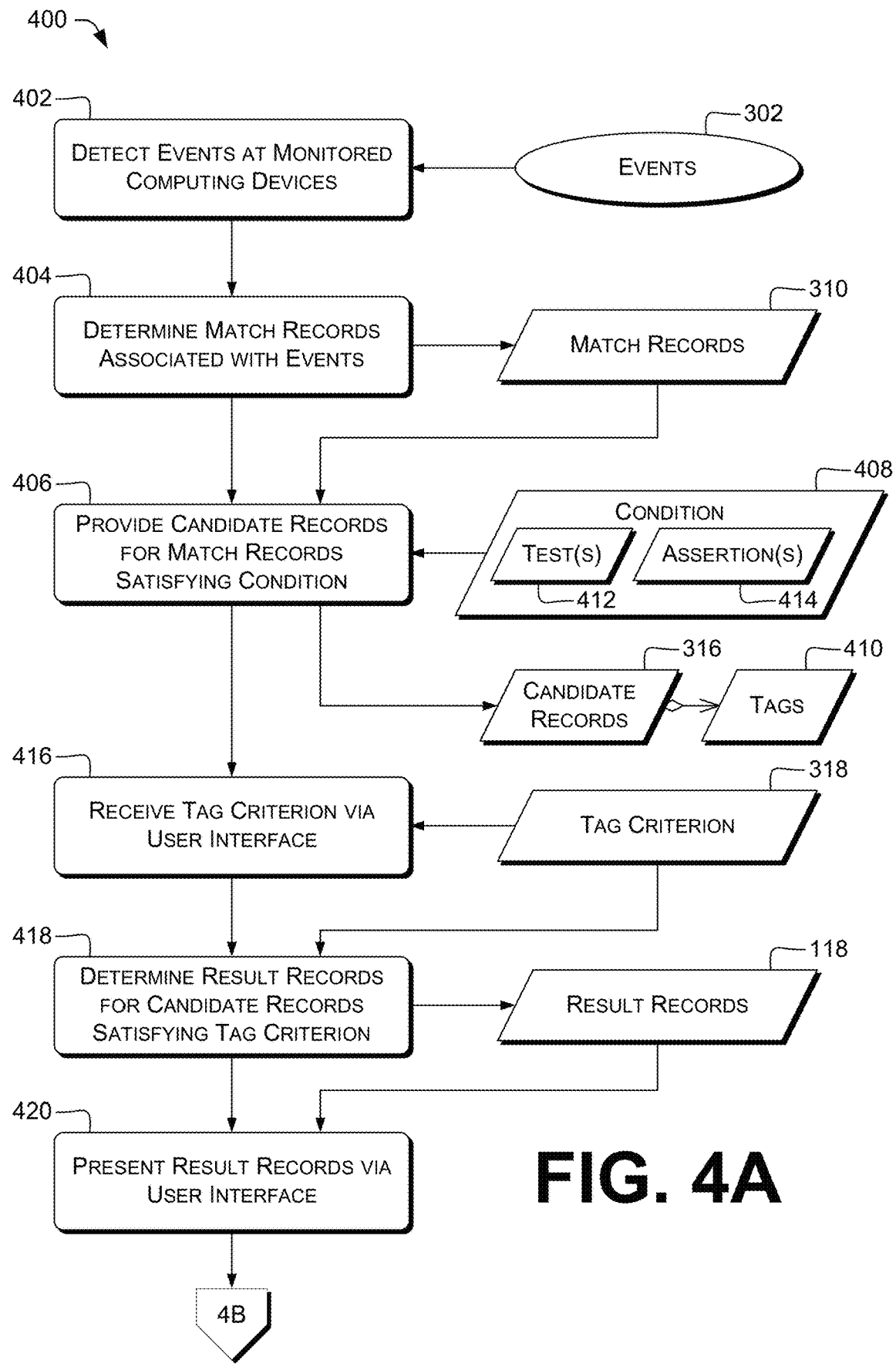
FIG. 4A is a first portion of a dataflow diagram that illustrates example processes for handling events, and related data items.
Figure 4B:
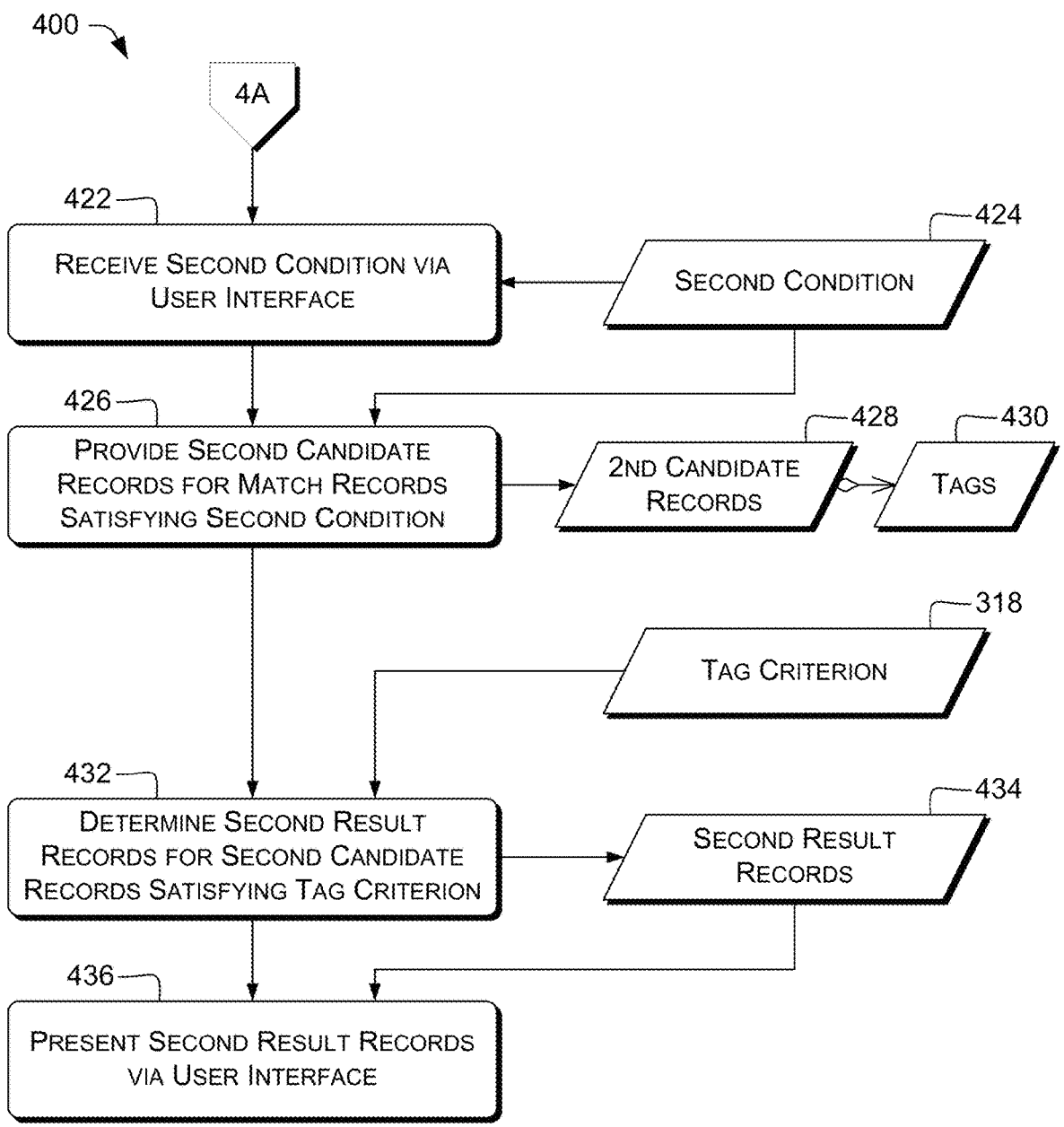
FIG. 4B is a second portion of the dataflow diagram begun on FIG. 4A.

FIGS. 4A and 4B form a dataflow diagram that illustrates an example process 400 for handling events, and related data items. Example functions shown in FIGS. 4A-4B, and in other flow diagrams and example processes herein, such as FIGS. 5-13, can be implemented on or otherwise embodied in one or more computing device(s) 102, 104, or 106, e.g., a computing device 200, e.g., using software running on such device(s), e.g., software executed by processing unit(s) 210. For the sake of illustration, the example process 400 is described below with reference to processing unit 210 and other components discussed with reference to FIGS. 1 and 2 (e.g., a control unit), and with respect to data items and operations shown in FIG. 3, that can carry out, participate in, or be processed by the steps of the example process 400. However, other processing unit(s) such as processing unit(s) 210 or other components of computing device(s) 102, 104, or 106 can carry out step(s) of described example processes such as process 400. Similarly, example method(s) or process(es) shown in FIGS. 5-13 also can be, but are not limited to being, carried out by any specifically-identified components.

In software embodiments of the processes, e.g., illustrated in FIGS. 4A-13, the number or arrangement of modules performing functions described herein may be different from that shown in FIG. 2. Accordingly, references to specific modules performing operations described herein are for clarity, and also envision other modules that may perform those operations. In embodiments using a control unit that does not execute computer program instructions, e.g., an FPGA or ASIC, references to specific modules below also envision sections of the hardware of such a control unit that cause the control unit to perform the described operations.

The order in which the operations are described in each example flow diagram or process is not intended to be construed as a limitation, and any number of the described operations can be combined in any order or in parallel to implement each process. In each flow diagram, fewer than all of the depicted operations can be performed, except as expressly noted. Moreover, the operations in each of FIGS. 4A-13 can be implemented in hardware, software, or a combination thereof. In the context of software, the operations represent computer-executable instructions that, when executed by one or more processors, cause the one or more processors to perform the recited operations. In the context of hardware, the operations represent logic functions implemented in circuitry, e.g., datapath-control and finite-state-machine sequencing functions. Therefore, descriptions of operations below also describe such software or hardware structures to carry out the described functions. Operations herein can be performed by modules described herein with reference to FIG. 2, or subsystems described herein with respect to FIG. 8 or 13.

Referring to FIG. 4A, in some examples, at operation 402, detection module 226 can detect a plurality of events 302. Each event 302 can occur at a monitored computing device 104 of a plurality of monitored computing devices 104. Any particular monitored computing device 104 may provide zero, one, or many events 302. Each event 302 has an event type 304, and detection module 226 can provide data of the event types. In some examples, detection module 226 can include or communicate with a "sensor" or "security agent," e.g., a software program, or firmware or hardware subsystem, that collects information of the events 302. In some examples, the sensor can be implemented using a kernel-mode component, e.g., a device driver or other module that hooks file- and process-related system calls and records information regarding those calls (e.g., parameters or results thereof).

In some examples, at operation 404, the matching module 228 can determine match records 310 associated with respective events 302 of the plurality of events 302. The matching module 228 can determine one match record 310 for each event 302. Examples are discussed herein, e.g., with reference to operation 308 or FIG. 6, 8, 9, 11, or 13.

In some examples, at operation 406, the testing module 230 can provide a candidate record 316 for each match record 310 satisfying a corresponding condition 408 of a condition set 312. Although only one condition 408 is depicted, the testing module 230 can test any individual match record 310 against any number of conditions 408 of the condition set 312. Examples of operation 404 are discussed herein, e.g., with reference to operation 314 or FIG. 6-8, 10, or 11. Each candidate record 316 can include a tag 410 associated with the corresponding condition 408. In some examples, the testing module 230 can include a rules engine or other logic-programming system, e.g., PYKE, DROOLS, or another rules engine. The condition set 312 can be or include a rule base of such a system.

In some examples, multiple conditions 408 can be tested against a single match record 310. For example, conditions 408 can be tested in a predetermined order, e.g., in alphanumeric order of names of conditions 408, or in order of recency of creation of condition 408. In some examples, a candidate record 316 can include tags 410 specified by more than one condition 408. In some examples, a later-tested condition 408 can remove a tag 410 applied by an earlier-tested condition 408.

In some examples, the condition 408 (e.g., a rule) can include test(s) 412 (or "premises") and assertion(s) 414 (or "consequences"). The tests 412 can test one field of the match record 310, or more than one field. Examples of tests 412 can include: that a value of a particular field equals a predefined test value; that a value is within a certain range; that a value is a member of a predefined group of values; that a value matches a regular expression ("regex") or other expression in a grammar; that a string value contains, begins with, or ends with a specified sub string; or that a Boolean expression over the results of other tests 412 of the condition 408 provides a predetermined result, e.g., True or False. Value tests can be performed on values of various types, e.g., string, integer, general numeric, or UUID.

In response to a match record 310 satisfying the test(s) 412 listed in the condition 408, the testing module 230 can apply the assertions 414. The assertions 414 can include, e.g., the tag 410 or other tags or data to be applied to the match record 310, or tags or other data to be removed from the match record 310, to produce the candidate record 316. For example, tag 410 can indicate a priority of the candidate record 316, e.g., "Suspicious," "To investigate," or "Urgent." A tag can additionally or alternatively indicate a state of the candidate record 316, e.g., "resolved" or "unresolved," a type of organization at which event 302 took place, or an internal classification for use by a security analyst. In some examples, a tag can be associated with tag data. For example, a suspicious event could be tagged with a "Suspicious" tag, or with a tag "Is suspicious?" associated with the tag data "Yes."

In some examples, an assertion 414 can include a programming-language statement, or machine code of a compiled subroutine, to be executed when the tests 412 are satisfied, e.g., a PYTHON or LUA statement, or a compiled C function. In some examples, an assertion 414 can include specify a change to be made to the state of testing module 230. For example, the assertion 414 can specify that a set of facts be cleared from a fact base stored in testing module 230, e.g., in preparation for testing another match record 310 against the condition 408. Other examples of assertions 414 are described herein with reference to operations 712-720.

In some examples, at operation 416, the searching module 232 or the presentation module 236 can receive, via a UI 202, a tag criterion 318. The tag criterion 318 can specify, e.g., a type of tag, or the text or other contents of a tag or tag data associated with that tag. For example, the UI 202 can present a selection control permitting entity 112 to select tags that should and should not be included, and can determine the tag criterion 318 reflecting the entity 112's choices. An example of such a tag criterion 318, expressed in a nonlimiting textual form, is "State=Unresolved AND HasTag(Suspicious)" (or, in another nonlimiting example form, "Suspicious+State/Unresolved").

In some examples, at operation 418, the searching module 232 can determine a result record 118 for each candidate record 316 having the respective tag 410 satisfying the tag criterion 318. Each result record 118 can include at least some data of the respective match record 310. For example, the searching module 232 can determine that a candidate record 316 matches the example tag criterion 318 from the previous paragraph if that candidate record 316 has the tag 410 "Suspicious," and also has a tag "State" with tag data "Unresolved."

In some examples, at operation 420, the presentation module 236 can present, via a UI 202, the result records 118. For example, the presentation module 236 can present the result records 118 in a list in descending order of severity, indicated by tag data associated with a "Severity" tag; in time order; or in another order. The presentation module 236 can present the results in graphical, textual, or other forms, e.g., using list controls, tree controls, audio outputs, or other types of output such as those discussed above with reference to display 204 and other output devices of UI 202.

Referring to FIG. 4B, in some examples, at operation 422, the testing module 230, the updating module 234, or the presentation module 236 can receive, via the UI 202, a second condition 424. For example, the presentation module 236 can present a query builder or other UI (referred to for brevity as a "condition-builder interface") having text or other selection fields to receive tests 412 and assertions 414 of the second condition 424. The updating module 234 can incorporate the received tests 412 and assertions 414 into condition set 312, or can add the received tests 412 and assertions 414 to a separate condition set.

For example, operation 422 can include providing the tests 412 and assertions 414 to a business-rules or logic-programming system, such as PYKE. The system can convert the tests 412 and assertions 414 to an internal form for future use in testing match records 310. Additionally or alternatively, operation 422 can include storing the tests 412 in a list or other data structure for retrieval when testing a match record 310, and can store the assertions 414 for retrieval when the tests 412 for a corresponding condition are satisfied.

In some examples, at operation 426, the testing module 230 can provide a respective second candidate record 428 for each match record 310 satisfying the second condition 424. Each second candidate record 428 can include a tag 430 associated with the second condition 424. Tag 430 can be as described herein with reference to tag 410. Examples are discussed herein, e.g., with reference to operation 406. In some examples, the testing module 230 can further update tags on existing match records 310 or candidate records 316 based at least in part on the second condition 424. Examples of such updating are described herein with reference to operation 1110.

In some examples, at operation 432, the searching module 232 can determine a second result record 434 for each second candidate record 428 having the respective tag 430 satisfying the tag criterion 318. Each second result record 434 can include at least some data of the respective match record 310. Examples are discussed herein, e.g., with reference to operation 418. In some examples, the searching module can additionally or alternatively determine a second result record 434 associated with at least one match record 310 that did not satisfy any condition in the condition set 312, but that does satisfy the second condition 424, as in FIG. 11.

In some examples, at operation 436, the presentation module 236 can present, via the UI 202, the second result records 434. Examples are discussed herein, e.g., with reference to operation 420.

Using operations 402-406, an event-handling system can significantly reduce the volume of events 302 to be inspected by providing candidate records 316 for only those events 302 satisfying the condition 408 of the condition set 312. Using operations 416-420, the event-handling system can permit entity 112, e.g., a security analyst, to further refine the set of events 302 to only those satisfying the tag criterion 318. This can permit entity 112 to rapidly triage suspicious events, and therefore can permit a security team to handle events across a larger set of computing devices 104 than is possible with, e.g., keyword searching of event records 114.

Using operations 422-432, the event-handling system can permit entity 112, e.g., a security analyst, to update the condition set 312 based on newly-discovered information. For example, a security analyst may analyze a result record 118 for an event that has not been seen before. The security analyst may determine that that event is likely to recur, but is not suspicious. The analyst can provide the second condition 424 having tests 412 matching that event, and having assertions 414 that mark match records 310 satisfying those tests 412 as not suspicious. This can remove the need for the analyst to triage or review future events already known to be not suspicious, which can reduce analyst workload. In some examples, already-processed candidate records 316 can be re-processed with respect to the second condition 424. This can permit information regarding, e.g., newly-discovered threats or attack vectors to be rapidly applied to events 302 not yet triaged by security analysts, which can reduce the probability of incorrectly overlooking a suspicious event (a "false miss" error).

Figure 5:
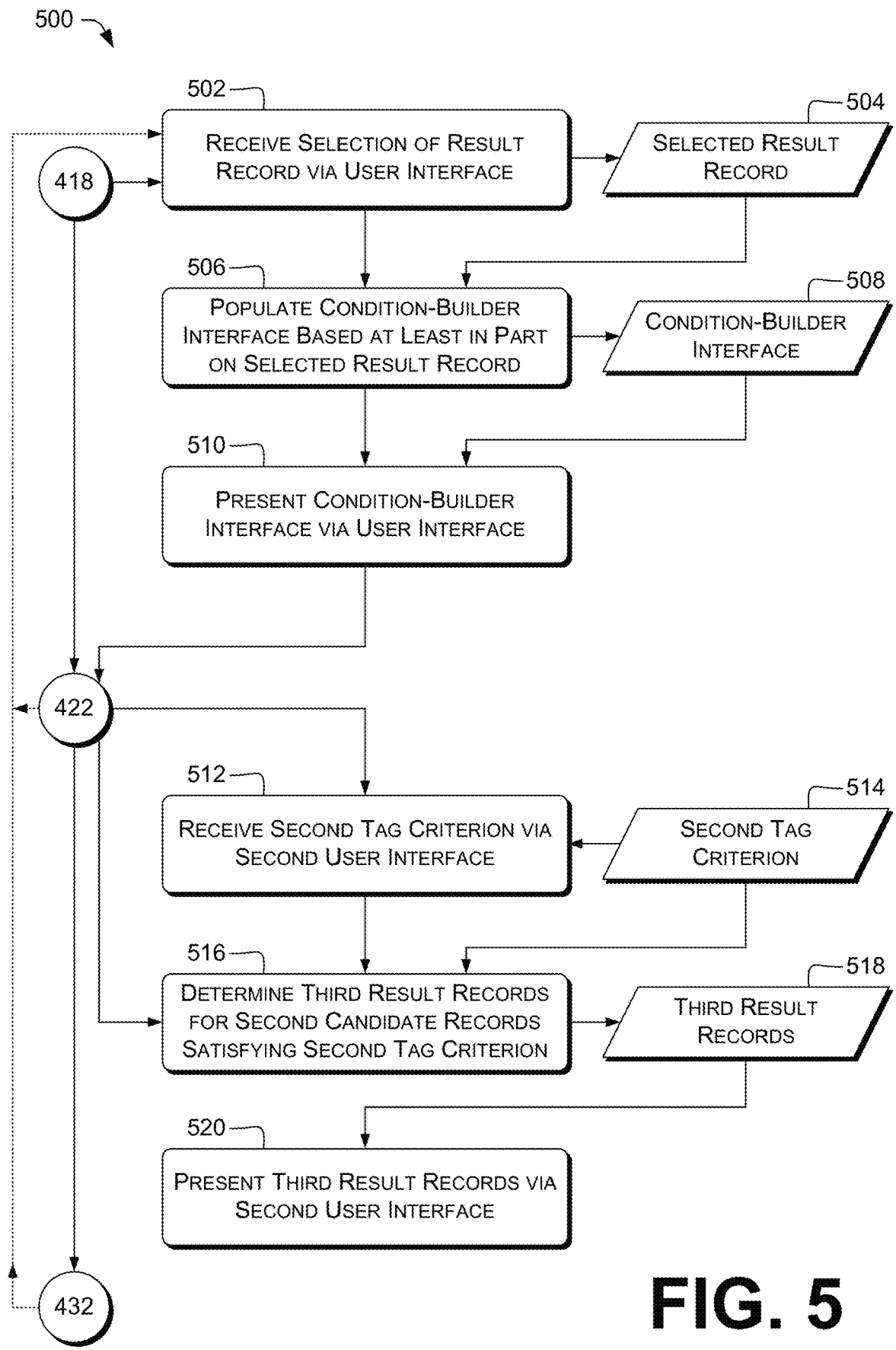
FIG. 5 is a dataflow diagram that illustrates example user-interaction operations in example processes for handling events, and related data items.

FIG. 5 is a dataflow diagram that illustrates an example process 500 for handling events, and related data items. Operations of process 500 can be performed by at least one computing device 102, 104, or 106. Some examples use only operations 502-510, or only operations 512-520, or operations 502-520. In some examples, operations 418, 422, or 432 can be followed by operations 502-510, or operation 422 can be followed by operations 512-520 or 516-520.

In some examples, at operation 502, the updating module 234 or the presentation module 236 can receive, via the UI 202, a selection of a selected result record 504 of the result records 118 (or of the second result records 434, or of the third result records 518 via the second UI, as depicted using stippled lines, and likewise throughout the discussion of FIG. 5). Operation 502 can be carried out before operation 422 of receiving the second condition 424. For example, UI 202 can provide an indication of a mouse click, keypress, or touch on the selected result record 504.

In some examples, at operation 506, the updating module 234 or the presentation module 236 can populate a condition-builder interface 508, e.g., a WINDOWS form or an HTML form, based at least in part on the selected result record 504. For example, the condition-builder interface 508 can include text fields or other data-entry fields such as those described herein with reference to operation 422. In some examples, the condition-builder interface 508 can include a predetermined selection of fields (e.g., event type); in some examples, the condition-builder interface 508 can include a data-entry field for each field in the selected result record 504.

Operation 506 can include populating data-entry fields of the condition-builder interface 508 with corresponding values taken from the selected result record 504. Additionally or alternatively, operation 506 can include populating data-entry fields for tests 412 or assertions 414 with expressions in a rule language, e.g., by substituting data from the selected result record into a predetermined template. Additionally or alternatively, operation 506 can include populating data-entry fields for tests 412 or assertions 414 with expressions in a rule language taken from predetermined list(s), any of which may be specific to certain event type(s) or applicable regardless of event type (or other fields in the selected result record 504).

In an example, event records 114 can carry an event type 304 and a hostname of the monitored computing device 104 at which the event 302 occurred. Operation 506 can include populating the condition-builder interface 508 with predetermined tests 412 based on the substitution patterns "hostname=% s" and "type=% d", and with predetermined assertions 414 "State←Resolved", "Malicious←No", and "Tags+=(Autoresolved)". For example, in response to an event of type 42 at hostname "douglas", the condition-builder interface 508 can be populated with the tests "hostname=douglas" and "type=42" (by substitution of values for "% s" and "% d" as in printf(3)), and the above-listed predetermined tests. Substitution, and use of predetermined templates or values for tests 412 or assertions 414, can permit an entity 112 to readily prepare second condition 424 to be satisfied by future events similar to that represented in the selected result record 504.

In some examples, at operation 510, the presentation module 236 can present, via the UI 202, the condition-builder interface 508. For example, the presentation module 236 can transmit HTML or JAVASCRIPT code of the condition-builder interface 508 for presentation by a Web browser of UI 202. Operation 422 can then include receiving data input via the condition-builder interface 508.

In some examples, at operation 512, the updating module 234 or the presentation module 236 can receive a second tag criterion 514. The second tag criterion 514 can be received via a second UI (e.g., having components such as those described herein with reference to UI 202) different from the UI. For example, the UI 202 and the second UI can execute on respective, different computing devices 106. Examples are discussed herein, e.g., with reference to operation 416. In some examples, operation 510 can be followed by operation 422, which can in turn be followed by operation 512. In some examples, operation 512 can be followed by operation 516.

In some examples, at operation 516, the testing module 230 can determine a respective third result record 518 for at least one of the second candidate records 428 having the respective tag 430 satisfying the second tag criterion 514 (or the candidate records 316 and tags 410). Each third result record 518 can include at least some data of the respective event record 114. Examples are discussed herein, e.g., with reference to operation 320, 418, or 432.

In some examples, at operation 520, the presentation module 236 can present, via the second UI, the third result records 518. Examples are discussed herein, e.g., with reference to operations 322, 420, or 436.

Using operations 512-520, for example, the second condition 424 provided via UI 202, e.g., by a first analyst, can be used in determining search results in response to the second tag criterion 514 provided via the second UI, e.g., for a second analyst. For example, at least one pattern set 306, condition set 312, condition 408, or second condition 424 can be shared among members of a group, e.g., via a group-readable datastore. This can permit rapidly and transparently sharing information between security analysts working, e.g., as part of a hunting team or other incident-response or security-operations organization. In some examples, second condition 424 is propagated or applied in real time or near-real-time across such an organization.

Figure 6:
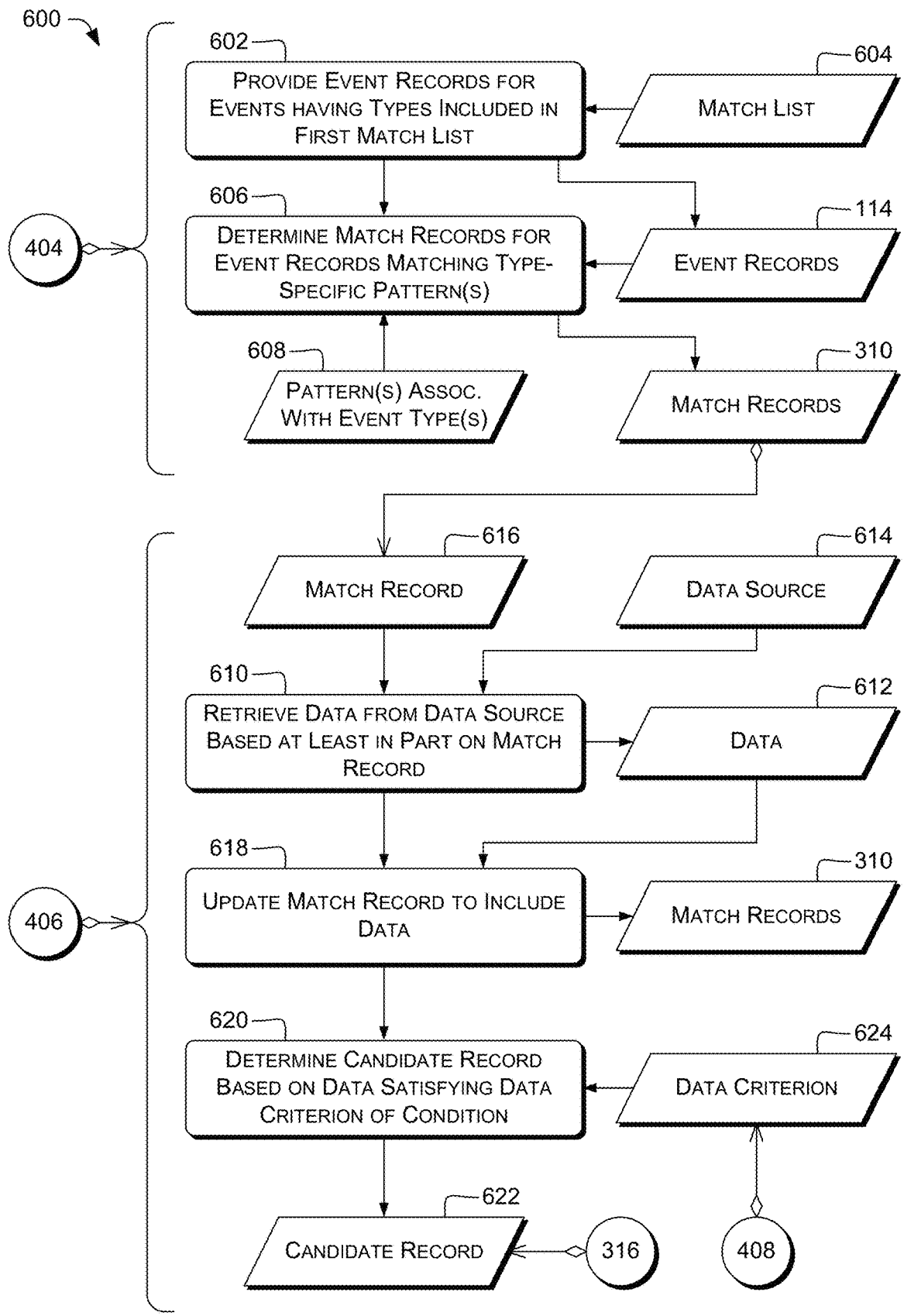
FIG. 6 is a dataflow diagram that illustrates example processes for handling events, and related data items.

FIG. 6 is a dataflow diagram that illustrates an example process 600 for handling events, and related data items. Operations of process 600 can be performed by at least one computing device 102, 104, or 106. In some examples, operations 610 and 618 can be performed by the matching module 228 or by a separate data-retrieval module. In some examples, operation 404 can include operations 602-606, or operation 406 can include operations 610-620.

In some examples, at operation 602, detection module 226 or communications module 224 can provide event records 114 for events 302 having the respective event types 304 included in a match list 604. Events having event types 304 not listed in the match list 604 can be dropped, or redirected to storage instead of to the processing shown in FIG. 3. This can reduce the volume of events to be handled by later stages of process 600 or other processing shown in FIG. 3. Operation 602 can be performed, e.g., at a computing device 102 or 104. In some examples, a match list 604 is not used, and event records 114 are provided for processing at operation 606 regardless of event type 304. Examples are discussed herein, e.g., with reference to operation 308.

In some examples, at operation 606, matching module 228 can determine a respective match record 310 for each event record 114 that matches a corresponding pattern 608 of one or more patterns associated with the respective event type 304. The patterns can include, e.g., compiled subroutines or other instructions to check presence or contents of fields in an event record 114. Examples are discussed herein, e.g., with reference to FIG. 9. In some examples, the patterns for each type can be hand-coded, or can be infrequently changed. Using compiled subroutines or similar patterns can provide high performance, which can permit processing a large number of event records 114 with reduced latency.

Using patterns that are specific to certain event types can reduce the processing required to determine match records 310, by eliminating the need to run patterns against event records 114 of types that are not relevant. For example, the patterns for "new process" event types can include a first pattern that tests the command line of that process, and exclude a second pattern that tests a file-creation timestamp. The patterns for "write file" event types, correspondingly, can exclude the first pattern and include the second pattern. In some examples, a particular pattern can be used for one event type 304 or for more than one event type 304.

In some examples, matching module 228 can provide each match record 310 including an identifier of the corresponding pattern in the pattern set 306, and at least some data of the respective event record 114. For example, the identifier can be a string, a number, or another unique identifier of the pattern. Including the identifier can permit the use of the identifier in testing match records 310 against condition sets 312. This can permit coordination between the patterns 608 and the condition sets 312, which can increase filtering accuracy. Including data of the respective event record 114 can provide condition sets 312 with additional information for use in filtering. Examples of such data can include event timestamps, filenames, file timestamps, hashes of files (e.g., SHA-256 hashes), process command lines (raw or decoded), command histories, process identifiers (PIDs) of a process or its parent, process group IDs (PGIDs), process output (e.g., to stdout or stderr), process exit codes, filenames of executables' primary modules, usernames or other user identifiers (e.g., SIDs), security-event indications (e.g., "logon," "logoff"), security credentials, logon times, subsystem identifiers (e.g., console vs. graphical), virtual host identifiers (e.g., in a hypervisor-managed system), version numbers, identifiers of the corresponding monitored computing devices 104 or the organizations to which they belong, local or remote network addresses or ports of network connections, or hostnames being resolved (e.g., using DNS).

In some examples, at operation 610, matching module 228 or communications module 224 can retrieve data 612 from a data source 614 based at least in part on a match record 616 of the match records 310. Operation 610 can be performed, e.g., before or as part of providing the candidate records 316 at operation 406. For example, operation 610 can include looking up hostnames (data 612) for IP addresses or other network addresses in the match records 310 from a DNS server (data source 614). Other examples of data 612 can include names for services on well-known ports (e.g., TCP port 23 for telnet), names associated with WINDOWS Security Identifiers (SIDs), usernames (e.g., from /etc/passwd), group names (e.g., from /etc/group), logon time or session duration (e.g., from an accounting service, daemon, or server), ancestry information (e.g., from history subsystem 1316), or information about the computing device 104 from which an event originated (e.g., service tag).

In some examples, at operation 618, matching module 228 can update the match record 616 to include the data 612. For example, matching module 228 can add the data 612 to the match record 616 as a new field, or can modify or remove an existing field based on the data 612.

In some examples, at operation 620, matching module 228 can determine, based at least in part on the match record 616, the respective candidate record 622 of the candidate records 316 based at least in part on the data 612 in the match record 616 satisfying a data criterion 624 of (e.g., associated with or included in) the corresponding condition 408. For example, at least one test 412 of the condition 408 can be or include the data criterion 624.

In some examples, the data source 614 can be a database of known-malicious hosts, domain names, filenames, or other system components or entities. In other examples, the data source 614 can be an open-access database such as VIRUSTOTAL.

For example, when a file is executed or about to be executed, matching module 228 can send a SHA-256 hash of that file's contents to VIRUSTOTAL (operation 610) and add the clean/dirty value(s) provided by VIRUSTOTAL to the match record 616 (operation 618). The matching module 228 can then determine that the event is a suspicious event, and therefore provide a candidate record 622, e.g., based on at least a certain number of "Dirty" results from VIRUSTOTAL.

Operations 610-620 can permit filtering based on data from one or more data source(s) 614 without requiring the monitored computing devices 104 to expend resources (e.g., processing power and storage) to retrieve the data 612, and without reduced network-bandwidth requirements (only transmitting the data 612 once, e.g., from data source 614 to cluster 108, rather than twice, from data source 614 to computing device 104 and then from computing device 104 to cluster 108).

Figure 7:
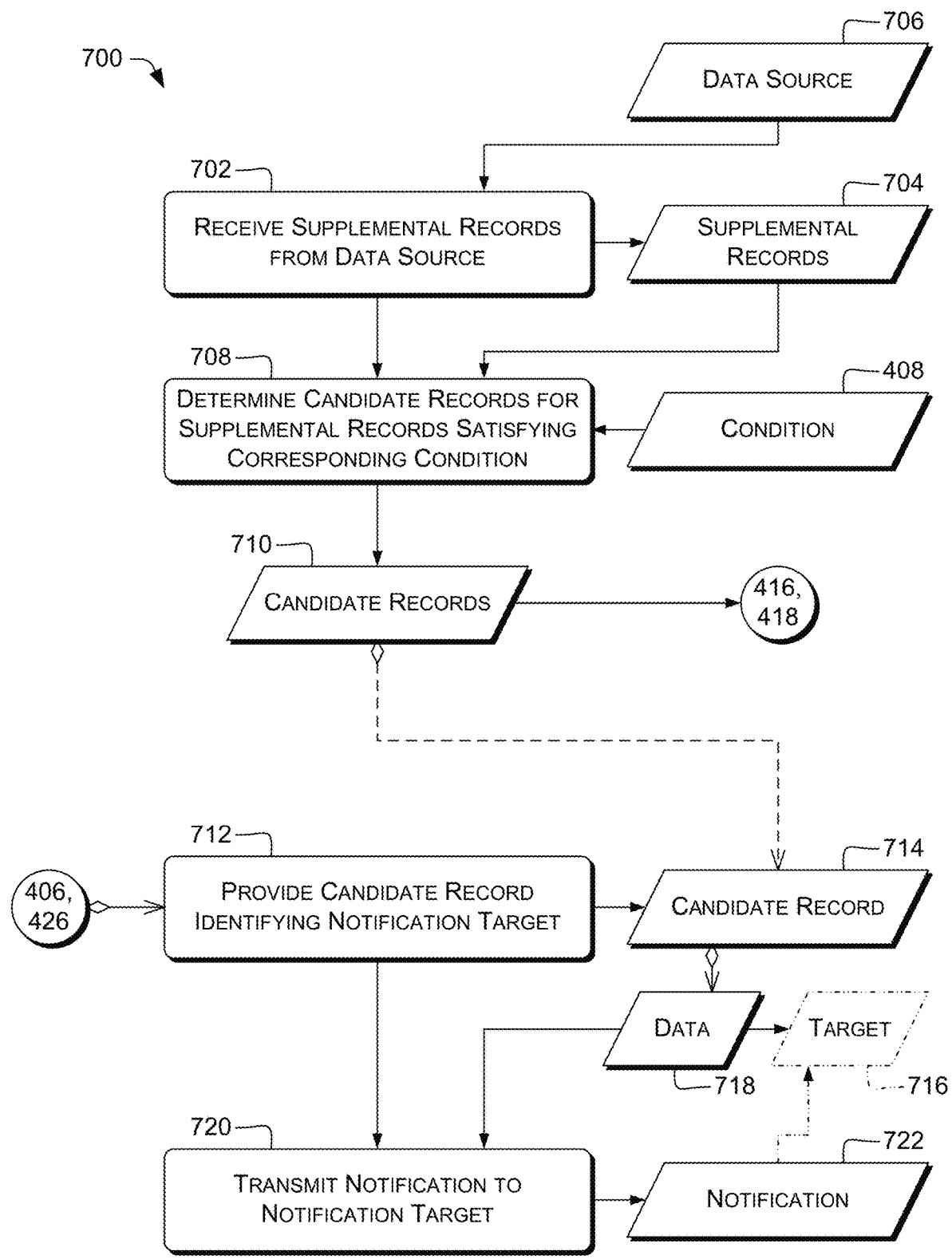
FIG. 7 is a dataflow diagram that illustrates example interactions with outside data sources or notification targets in example processes for handling events, and related data items.

FIG. 7 is a dataflow diagram that illustrates an example process 700 for handling events, and related data items. Operations of process 700 can be performed by at least one computing device 102. In some examples, operations 702-708 can precede operations 416 or 418, or operations 406 or 426 can precede operations 712-720.

In some examples, at operation 702, the communications module 224 or the matching module 228 (or a separate data-retrieval or -collection module) can receive one or more supplemental records 704 from a data source 706. In some examples, at least one of the supplemental records 704 can represent supplemental record 324, FIG. 3. Data source 706 can include, e.g., a feed of data from a publishing system via a message queue or other publish/subscribe mechanism.

In some examples, at operation 708, the matching module 228 can provide a respective candidate record 710 for each supplemental record 704 satisfying a corresponding condition 408 of the condition set 312. Each candidate record 710 can include a tag 410 associated with the corresponding condition 408. Examples are discussed herein, e.g., with reference to operations 314, 406, or 426. Operation 708 can be followed by operation 416 or 418 (or operation 432).

Using operations 702 and 708 can permit incorporating data from multiple data sources into an event-handling process, with reduced load on the monitored computing devices 104 and with reduced network-bandwidth utilization, as described herein with reference to operations 610-620. Using operations 702 and 708 can additionally or alternatively permit processing events not detectable at client computers, e.g., desktop or laptop PCs. For example, data source 706 can provide supplemental records 704 indicating hostnames being resolved via managed DNS servers. Those DNS servers may not themselves be monitored computing devices 104, but information about what hostnames are being resolved can be used in detecting activity of botnets or in locating attackers attempting to probe the internal structure of corporate networks.

In some examples, at operation 712, matching module 228 can provide a candidate record 714 identifying a notification target 716 (shown in phantom). Operation 712 can be performed can be in response to the respective match record 310 (or supplemental record 704, and likewise throughout) satisfying the corresponding condition 408. In some examples, candidate record 714 can be a candidate record 316 or a candidate record 710, as indicated by the dashed arrow.

In some examples, candidate record 714 can include data 718 identifying the notification target 716. For example, as described herein with reference to operation 406, at least one assertion 414 can specify data 718 that is to be added to candidate records 316 satisfying the corresponding condition 408. The notification target 716 can identified by data 718 in the candidate record 316 that is or includes, e.g., an email address, a HIPCHAT, IRC, or other instant-messaging (IM) username, a cellular, fax, or pager phone number, or other contact information.

In some examples, at operation 720, matching module 228 or communications module 224 can transmit, to the notification target 716, a notification 722 of the candidate record 316. The notification 722 can be or include at least a portion of the candidate record 316. Additionally or alternatively, the notification 722 can be or include an indication of the candidate record 316, e.g., a link to access the candidate record 316 via a Web interface. In some examples, operation 720 is performed regardless of whether the candidate record 316 satisfies the tag criterion 318. This can permit notifying interested parties independently of review of the candidate record 316 or a corresponding result record 118 by entity 112, e.g., a security analyst.

Figure 8:
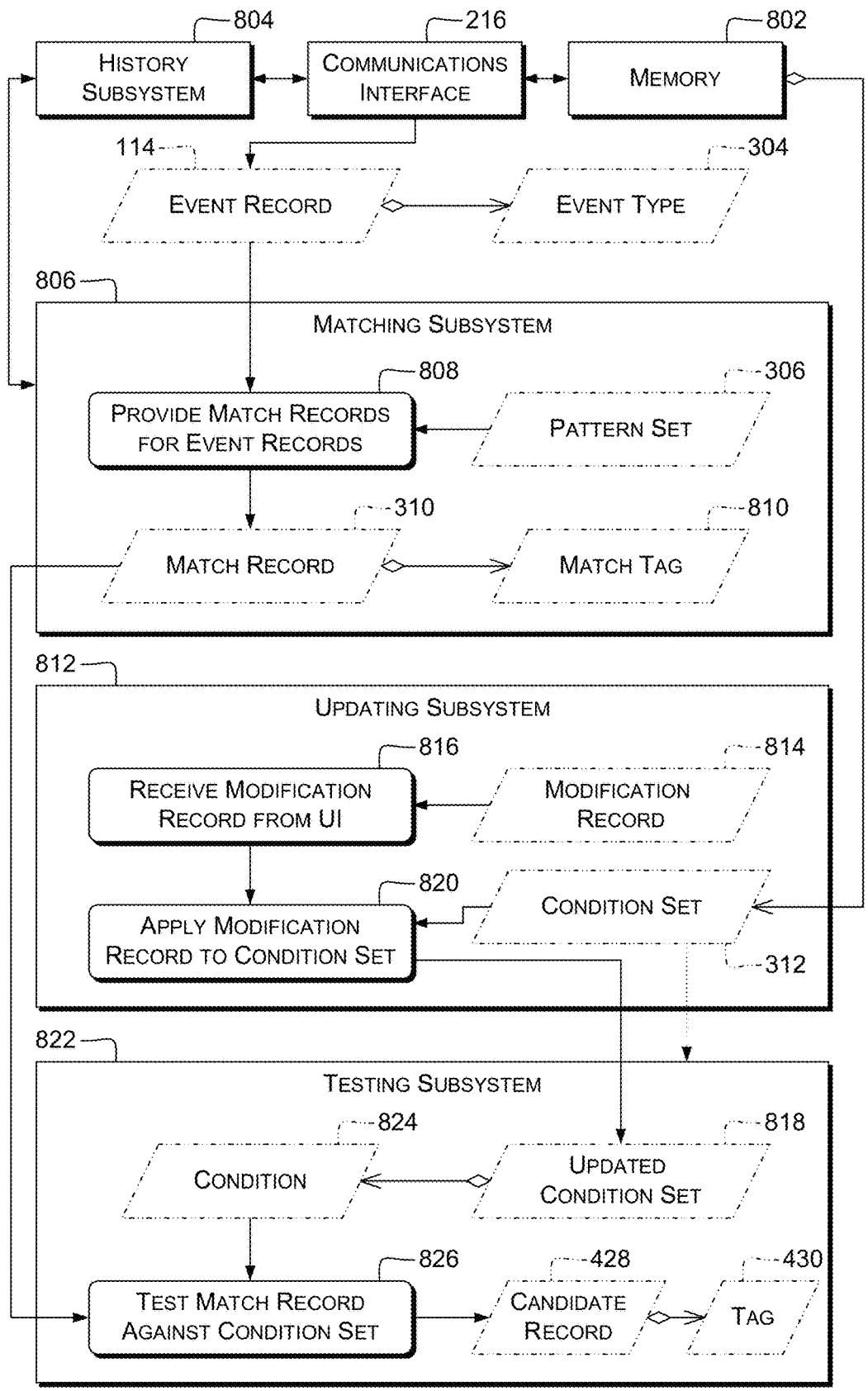
FIG. 8 illustrates an example system for handling events, example operations performed by the system, and related data items.

FIG. 8 is a diagram that illustrates an example system 800 for handling events, functions thereof, and related data items. The depicted data items are shown in phantom since they are not part of the system 800, but are produced or operated on by the system 800. Depicted operations of system 800 can be performed by at least one computing device 102. System 800 can include, e.g., one or more computing device(s) 102 or 200, e.g., organized in a cluster 108 or security appliance. System 800 can include a computer-readable memory 802, e.g., memory 212 or CRM 214, storing a condition set 312 having one or more conditions 408, 424. In some examples, memory 802 can also store an identifier set, described herein with reference to FIG. 12. In some examples, system 800 can include a history subsystem 804, described herein with reference to FIG. 13.

System 800 can include a communications interface 216 configured to receive event records 114 of a plurality of events 302. As discussed above, each event record 114 can be associated with a monitored computing device 104 and can have an event type 304. Examples are discussed herein, e.g., with reference to operations 402 and 602.

System 800 can include a matching subsystem 806 configured to provide, for each event record matching a corresponding pattern of a pattern set 306 associated with the respective event type 304, a respective match record 310 (operation 808). Each match record 310 can include an identifier of the corresponding pattern, and at least some data of the respective event record 114, as discussed herein with reference to operation 606. Examples are discussed herein, e.g., with reference to operations 308, 404, or 606. In some examples, a match record 310 can additionally or alternatively include a match tag 810, e.g., added in response to instructions included in the pattern set 306. Matching subsystem 806 can include matching module 228 or other related components, e.g., a control unit or portion of a control unit configured to perform operation 808 or other functions of matching subsystem 806 described herein. For example, matching subsystem 806 can include computer-executable instructions of matching module 228.

System 800 can include an updating subsystem 812 configured to receive, from a UI 202, a modification record 814 specifying a modification to a condition 408 (operation 816). The modification can be, e.g., an addition, removal, or alteration of the condition 408. Examples are discussed herein, e.g., with reference to operation 422. The updating subsystem 812 can be configured to apply the modification record 814 to the condition set 312 to provide an updated condition set 818 (operation 820). Examples are discussed herein, e.g., with reference to operations 422 or 506-510, or second condition 424. Updating subsystem 812 can include updating module 234 (e.g., computer-executable instructions thereof) or other components (e.g., control units or portions thereof) performing functions of updating subsystem 812 described herein. In some examples, the testing subsystem 822 is configured to provide candidate records 316, 428 both before and after the update at operation 820.

System 800 can include a testing subsystem 822 configured to provide, for each match record 310 satisfying a corresponding condition 824 of the updated condition set 818 (or of the condition set 312, as indicated by the dotted arrow), a respective candidate record 428 comprising a tag 430 associated with the corresponding condition 824 (operation 826). Examples are discussed herein, e.g., with reference to operations 314, 406, 426, 620, or 708.

In some examples, the testing subsystem 822 is further configured to determine that a match record of the match records 310 includes the match tag 810. The testing subsystem 822 is further configured to provide the respective candidate record 428 of the candidate records excluding the match tag 810, based on the corresponding condition 424. This can permit entities 112 to use conditions 824 to override processing at earlier stages, e.g., in the matching subsystem 806. This can provide security analysts additional flexibility while still maintaining the benefits of matching subsystem 806 in reducing the volume of events without losing suspicious events.

Using system 800 can permit more efficiently filtering events, e.g., to provide security analysts or notification targets 716 with information regarding only suspicious events. In some examples, the matching subsystem 806 is relatively faster and less flexible, so can effectively handle a high volume of incoming event records 114. In some examples, the testing subsystem 822 is relatively slower and more flexible, so can effectively permit security analysts and other entities 112 to fine-tune which events are considered by the condition set 312 to be suspicious events. In some examples, the updating subsystem 812 permits entities 112 to adjust the condition sets 312 to achieve this fine-tuning.

FIG. 9 illustrates components of an event-handling system 900, and (in phantom) data items used or processed by system 900.

In some examples, the matching subsystem 806 comprises a plurality of compiled subroutines 902(1)-902(P) (individually or collectively, subroutines 902) (P≥1) corresponding to respective pattern sets 904(1)-904(P) (individually or collectively, pattern sets 904) of a plurality of pattern sets. Each pattern set 904 can represent a pattern set 306. In some examples, a single compiled subroutine 902 can be associated with multiple patterns of a pattern set 904, or with multiple patterns of multiple pattern sets 904. In some examples, multiple compiled subroutines 902 can be associated with respective patterns, or respective groups of patterns, of an individual pattern set 904.

In some examples, the compiled subroutines 902 can include machine code ready for loading by OS 220 or for execution by processing unit(s) 210. Additionally or alternatively, in some examples, at least one compiled subroutine 902 can include compiled bytecode for a virtual machine, e.g., PYTHON or JAVA bytecode. In some examples, at least one compiled subroutine 902 can include compiled bytecode for a domain-specific language (DSL) for expressing patterns of a pattern set 904. In some examples, at least one compiled subroutine 902 can be contained in a shared library (e.g., a .so or .DLL). In some examples, matching subsystem 806 can comprise a compiled, linked executable (e.g., on CRM 214 or loaded into memory 212) and at least one compiled subroutine 902 can be a statically-linked component of that executable.

In some examples, the matching subsystem 806 is configured to test an event record 114 of the event records 114 against the pattern set 904 associated with the respective event type 304 by executing the respective compiled subroutine 902 of the plurality of compiled subroutines 902 (operation 906). The matching subsystem 806 can select the respective compiled subroutine 902, e.g., using a lookup or jump table indexed by event type 304. The matching subsystem can then execute the respective compiled subroutine 902.

The compiled subroutine 902 can execute code to test the event record 114 against one or more patterns of the respective pattern set 904. The matching subsystem 806 can then receive from the compiled subroutine 902 a Boolean or other result value indicating whether or not the event record 114 matches at least one pattern of the respective pattern set 904. In addition to or instead of returning a Boolean value, the respective compiled subroutine 902 can modify the event record 114 in place to transform the event record 114 into the match record 310, or can copy the event record 114 to the match record 310 and modify the copy. In some examples, the matching subsystem 806 can provide to other stages of processing only match records 310 matching at least one pattern, e.g., as discussed herein with reference to operation 606. In other examples, the matching subsystem 806 can additionally provide to other stages of processing at least one match record 310 that does not match any pattern of the corresponding pattern set 904. Such records can be distinguished, e.g., by presence or absence of a field, or by a field's value. For example, such records may include a "NoMatch" tag, omit a "Match" tag, or omit a "Pattern" field that would otherwise hold an identifier of the matching pattern.

In some examples, the updating subsystem 812 includes a parser 908. Parser 908 is configured to parse a textual condition specification in the modification record 814 and provide corresponding modification instructions 910. For example, parser 908 can include a parser for a regular, context-free, or context-sensitive language, e.g., regular-expression replacement specification(s) (of the form s/α/β/, for example) or programming-language statement(s) (e.g., in PYTHON or the PYKE domain-specific language). Parser 908 can include a recursive-descent, shift-reduce, or other parser. Parser 908 can provide the modification instructions 910 comprising, e.g., source-code statements to be executed by an interpreter to make the desired modifications, or patch files or other lists to be applied by a patching routine.

In some examples, parser 908 can include computer-executable instructions to retrieve information from a fixed-form modification record 814. For example, a condition-builder interface such as described herein with reference to operation 422, implemented as a Web page or site, can provide the modification record 814 in the application/x-www-form-urlencoded format in a GET or POST request, in the multipart/form-data format in a POST request, or (e.g., via AJAX or another side-channel transport) in JSON, XML, Windows INI, SMTP-header, or other formats. Parser 908 can include computer-executable instructions to parse the received data and extract the values (e.g., tests 412 and assertions 414 of second condition 424) from the received data.

In some examples, the updating subsystem 812 is configured to apply the modification record 814 at least partly by carrying out the corresponding modification instructions 910 (operation 912). For example, updating subsystem 812 can include a programming-language interpreter (e.g., /usr/bin/python3), a patch program (e.g., /usr/bin/patch), or other computer-executable instructions to apply the modification instructions 910 to the condition set 312 to provide the updated condition set 818.

In some systems using matching subsystem 806 and updating subsystem 812 as described with reference to FIG. 9, pattern sets 904 can be represented in the relatively higher-speed, lower-flexibility form of compiled subroutines 902. Conditions can be represented in the relatively lower-speed, higher-flexibility form of textual information in modification records 814. As discussed above with reference to FIG. 8, this can provide an effective balance of processing speed, analyst flexibility, and filtering accuracy.

Figure 10:
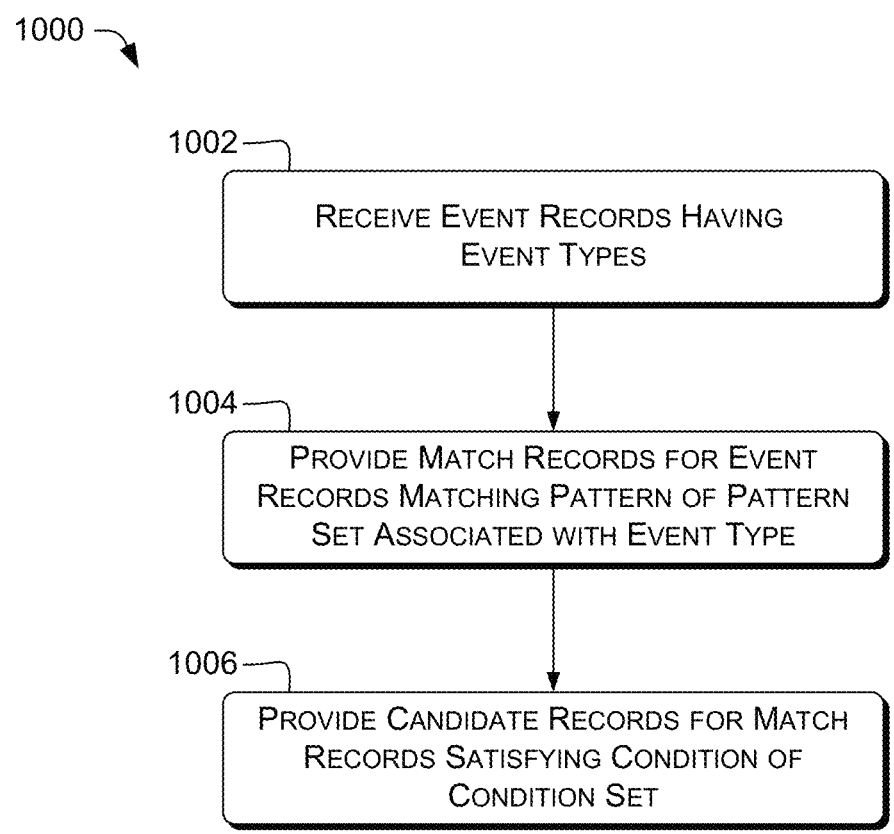
FIG. 10 illustrates an example process for handling events.

FIG. 10 is a flow diagram illustrating an example process 1000 for handling events. Operations of process 1000 can be performed by at least one computing device 102.

In some examples, at operation 1002, the communications module 224 or the detection module 226 can receive event records 114 of a plurality of events 302. Each event record 114 can be associated with (e.g., can have taken place on or can be taking place on) a monitored computing device 104. Each event record 114 can have an event type 304. Examples are discussed herein, e.g., with reference to communications interface 216, FIG. 3, or operations 402 or 702.

In some examples, at operation 1004, matching module 228 or matching subsystem 806 can provide a match record 310 for each event record 114 matching a corresponding pattern of a pattern set 306 associated with the respective event type 304. Each match record 310 can include an identifier of the corresponding pattern and at least some data of the respective event record 114. Examples are discussed herein, e.g., with reference to FIG. 3 or operations 404, 606, or 808.

In some examples, at operation 1006, testing module 230 or testing subsystem 822 can provide a candidate record 316 for each match record 310 satisfying a corresponding condition 408 of a condition set 312. Each candidate record 316 can include a tag 410 associated with the corresponding condition 408. Examples are discussed herein, e.g., with reference to FIG. 3 or operations 406, 426, 620, 708, or 826. In some examples, operation 1006 can be followed by operation 418, 432 or 516, to provide result records 118 matching given tag criteria 116.

Figure 11:
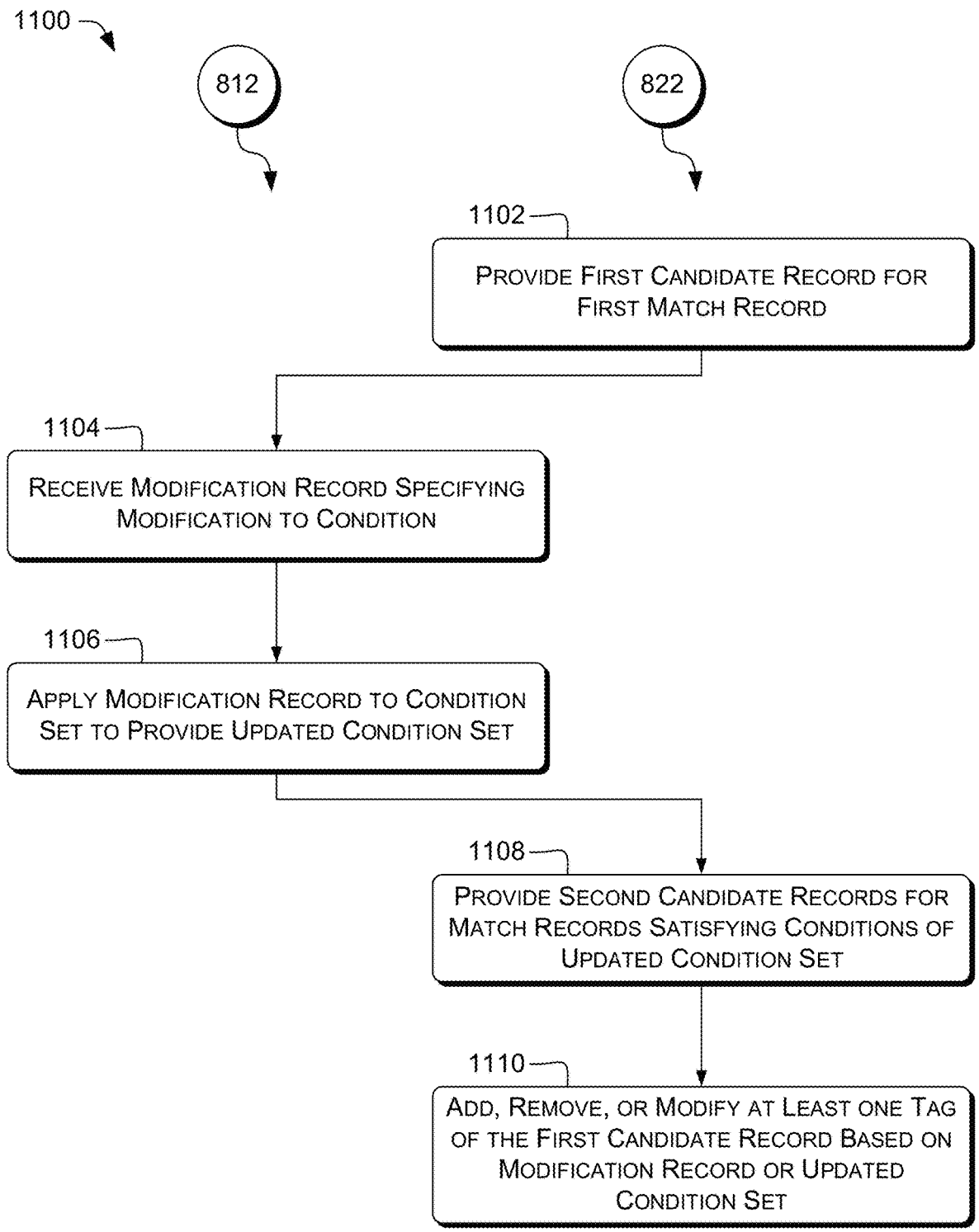
FIG. 11 illustrates an example process for handling events and for processing modifications to a condition set.

FIG. 11 is a flow diagram illustrating an example process 1100 for handling events. Operations of process 1100 can be performed by at least one computing device 102. In some examples, operation 1006 can include operations 1102, 1108, or operation 1110. In some examples, operations 1104 and 1106 can follow operation 1006.

In some examples, at operation 1102, the testing module 230 or the testing subsystem 822 can provide a first candidate record for a first match record of the respective match records 310. The first match record can satisfy a corresponding condition of the condition set 312, e.g., condition 408. Examples are discussed herein, e.g., with reference to operations 314, 406, 426, 620, 708, 826, 906, or 1006.

In some examples, at operation 1104, communications module 224, updating module 234, or updating subsystem 812 can receive, via a UI 202, a modification record specifying a modification to a condition. The modification can include, e.g., an addition or removal of a condition, or an alteration to an existing condition. The modification record can be or include, e.g., second condition 424 or modification record 814. Examples are discussed herein, e.g., with reference to operations 422 or 816.

In some examples, at operation 1106, updating module 234, or updating subsystem 812 can apply the modification record to the condition set to provide an updated condition set 818. Examples are discussed herein, e.g., with reference to operations 422 or 820.

In some examples, at operation 1108, the testing module 230 or the testing subsystem 822 can provide a respective second candidate record 428 for each match record 310 satisfying a corresponding second condition 424 of the updated condition set. Each second candidate record 428 can include a tag 430 associated with the corresponding second condition 424. Examples are discussed herein, e.g., with reference to operations 314, 406, 426, 620, 708, 826, 906, or 1006.

In some examples, at operation 1110, the testing module 230 or the testing subsystem 822 can add, remove, or modify at least one tag of the first candidate record based at least in part on at least one of the modification record or the updated condition set 818. Operation 1110 can be performed subsequent to receiving the modification record at operation 1104. Examples are discussed herein, e.g., with reference to operations 618 or 912.

For example, after processing of an event record 114 to determine a respective candidate record 316, an entity 112 (e.g., a security analyst) may provide a modification record pertinent to that event record 114. Operation 1110 can be carried out to re-tag or re-classify already-processed candidate records 316. This can reduce the volume of events to be processed or increase the accuracy of the determination of suspicious events. For example, if the modification record indicates that the event 302 corresponding to the event record 114 is not a suspicious event, the respective candidate record 316 can be modified, e.g., to remove a "Suspicious" tag, or to set a "Suspicious" field's value to "No". Alternatively, if the modification record indicates that the event 302 is a suspicious event, the respective candidate record 316 can be modified, e.g., to add a "Suspicious" tag, or to set a "Suspicious" field's value to "Yes".

Figure 12:
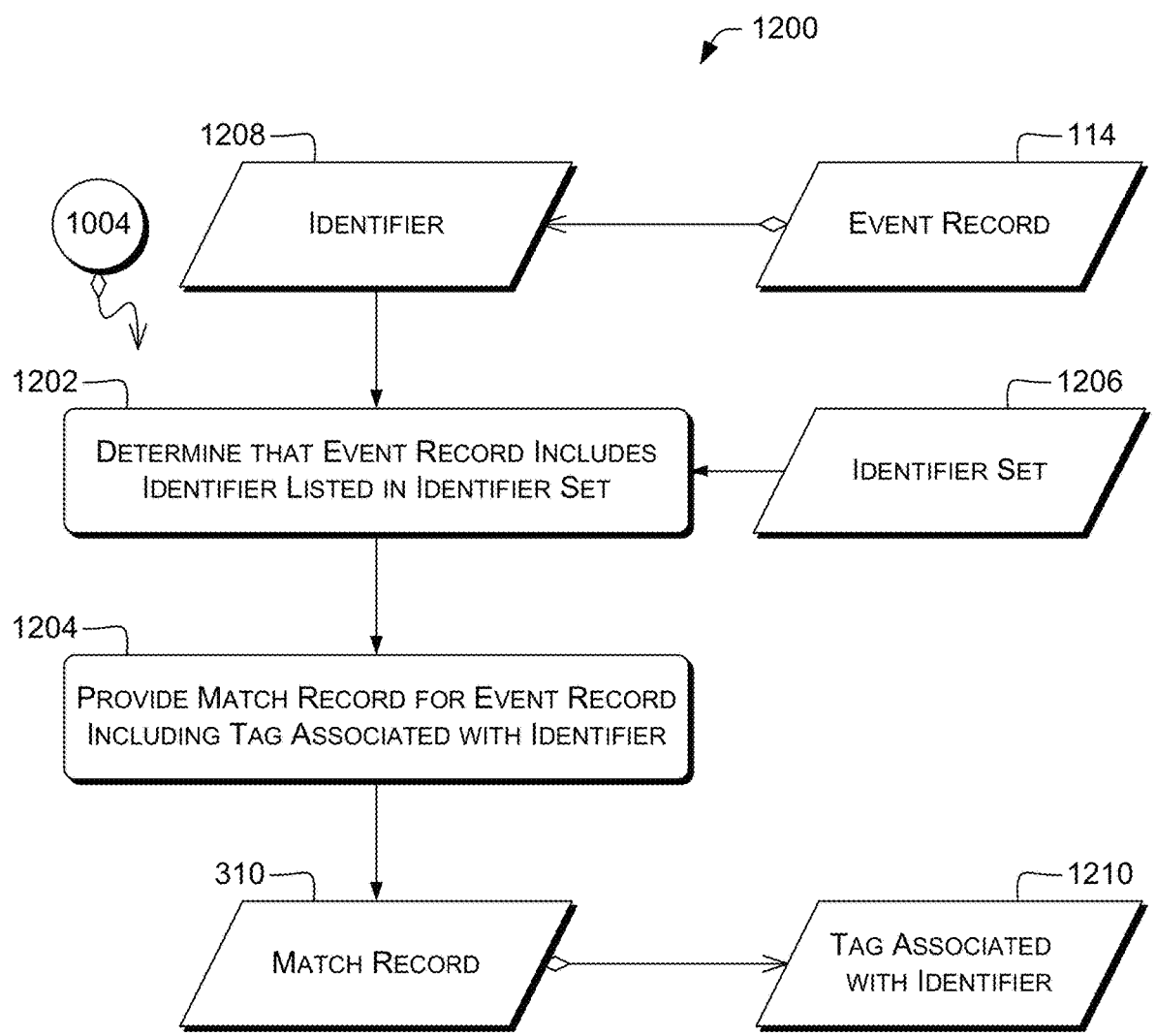
FIG. 12 illustrates an example process for handling events based on identifiers included in event records.

FIG. 12 is a flow diagram illustrating an example process 1200 for handling events. Operations of process 1200 can be performed by at least one computing device 102. In some examples, operation 1004 can include operations 1202 and 1204. Examples of process 1200 are described herein with reference to data source 614 or operation 620.

In some examples, at operation 1202, the matching module 228 or the matching subsystem 806 can determine that an event record of the event records comprises an identifier 1208 listed in the identifier set 1206 discussed above with reference to memory 802. For example, the identifier set can include identifiers of known-malicious system components or entities, as discussed herein with reference to data source 614. In some examples, identifier set 1206 can be updated, e.g., on the fly, and changes can take effect substantially immediately. In some examples, identifier sets 1206 are shared within an organization, e.g., of multiple security analysts, as described herein.

In some examples, at operation 1204, the matching module 228 or the matching subsystem 806 can provide the respective match record of the match records 310 comprising a tag 1210 that is associated with the identifier 1208. For example, the tag 1210 can signify that the respective match record represents a suspicious event because that event involved interaction with a known-malicious system component, host, entity, or other named item. The tag 1210 can be in addition to, or instead of, any other tag on the respective match record, e.g., tags 410. In some examples, tag 1210 has the same form as tag(s) 410; in other examples, a different form.

In some examples, identifier set 1206 can be implemented using a hash table, a hash map, a trie, or a binary search tree. Operation 1202 can include searching the identifier set 1206 for the identifier 1208 in the event record 114, e.g., a text string. Searching can be performed by hash-value computation, tree traversal, or other search techniques. Additionally or alternatively, identifier set 1206 can be implemented using a finite-state automaton (FSA) such as a discrete finite automaton (DFA), or a finite-state transducer (FST). Operation 1202 can include traversing the FST (or other automaton, and likewise throughout the discussion of FIG. 12 unless otherwise indicated) beginning at a predetermined starting state thereof. While traversing, at each state, a present value of the identifier in the event record 114 can be used to select an outgoing edge to be followed from that state. For example, successive characters (or codepoints, graphemes, or bytes) of the identifier can be used to determine the edges to follow from successive states. Operation 1202 can include determining that the identifier is in the identifier set if the traversal ends in an accepting state of the FST. Using FSTs can permit rapidly searching large identifier sets 1206, since it is not required that the entire FST be in memory at one time. In some examples, the FST is accessed via memory mapping, and only recently-accessed pages of the FST are retained in memory, the rest being on disk or another backing store.

In some examples, the tag 1210 associated with the identifier 1208 can be provided as an output of the search at operation 1202. For example, operation 1202 can include retrieving a value from a hash map indexed by identifier 1208. That value can be or represent the tag 1210. Operation 1204 can include applying the tag 1210, or using the retrieved value to look up the tag 1210 in a tag table. In some examples using an FST, the search at operation 1202 can return a whole-path value associated with the path taken through the FST to an accepting state. For example, the whole-path value can be the sum of per-edge values on each edge along that path. Operation 1204 can include looking up the value in a tag table to determine the tag 1210, and applying the tag 1210 to the match record 310. In some examples, the per-edge and whole-path values are not numeric, but instead textual or another form of data. In some examples, the whole-path value can be the tag 1210 to be applied to the match record 310 at operation 1204.

Figure 13:
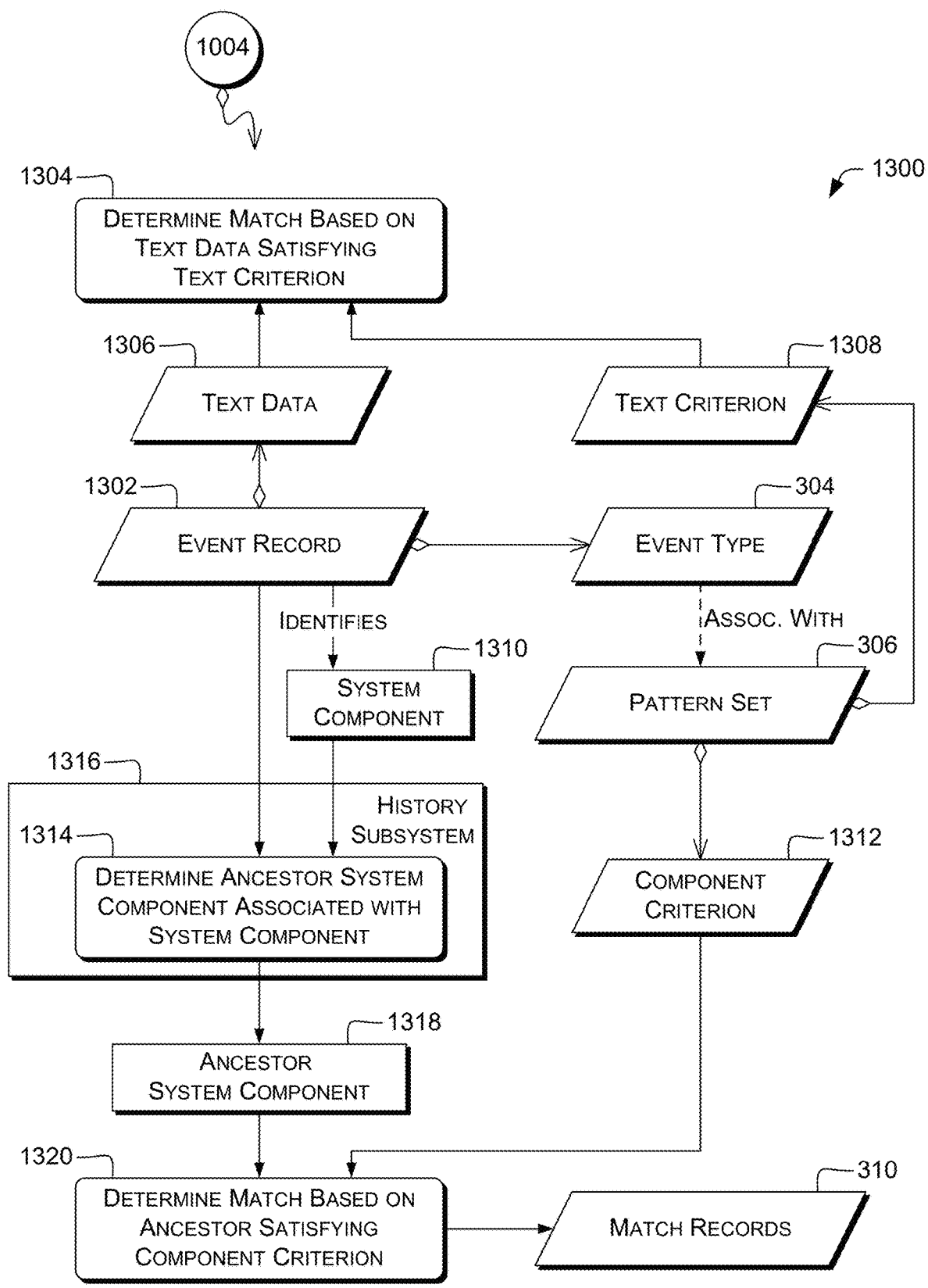
FIG. 13 illustrates example processes for handling events based on information included in event records, and related system components and data items.

FIG. 13 is a diagram illustrating an example process 1300 for handling events, related components of system 800, and data items used or produced by system 800 or process 1300. Operations of process 1300 can be performed by at least one computing device 102. In some examples, operation 1004 can include operations 1304-1320. In some examples, operations 1314-1320 are used alone, or operation 1304 is used alone, or both operation 1304 and operations 1314-1320 are used. Some examples of process 1300 relate to an event record 1302 of the event records 114. Examples of matching of fields of event record 1302 are described herein with reference to tests 412 or operation 406.

In some examples, at operation 1304, the matching module 228 or the matching subsystem 806 can determine that an event record 1302 matches the corresponding pattern of the pattern set 306 at least partly based on text data 1306 of the event record 1302 satisfying a text criterion 1308. The text data 1306 can include, e.g., an image filename, command line, username, or other text data associated with the event 302. The text criterion 1308 can be defined in the pattern set 306 associated with the event type 304 of the event record 1302. For example, the text criterion 1308 can include a regex or substring to match. Additionally or alternatively, the text criterion 1308 can include a reference string and an edit-distance threshold. The text criterion 1308 can be included in or associated with the corresponding pattern of the pattern set 306.

In some examples, operation 1304 can include transforming the text data 1306 to provide transformed text data, and determining that the text data 1306 satisfies the text criterion 1308 if the transformed text data satisfies the text criterion 1308. For example, the transforming can include decompressing the text data 1306, e.g., using LZW, DEFLATE, ZIP, 7Z, LZMA, or other compressors. Additionally or alternatively, the transforming can include decoding the text data 1306, e.g., using base64, urldecode, rot13, or other coding techniques. Additionally or alternatively, the transforming can include changing the encoding (character-to-bitstream mapping) of text into a canonical form. For example, the text criterion 1308 can be expressed in UTF-8. Operation 1304 can include attempting to convert the encoding of the text data 1306 to UTF-8 from other encodings, such as UTF-16, UTF-32, latin1, EUC-JP, KOI8, Big5, or other encodings. If decompression, decoding, or encoding-changing fails for a particular technique (compression method, coding technique, or source text encoding), that technique can be disregard, and other techniques can be tried. Some examples of operation 1304 can include any combination of the above, e.g., decompression; if that succeeds, encoding conversion to UTF-8; and if that succeeds, decoding.

In some examples, the text criterion 1308 can include the reference string "explorer.exe" and the edit-distance threshold 2. "Edit distance" refers to the number of discrete changes, e.g., single-character changes, required to transform the text data 1306 into the reference string, or vice versa. Operation 1304 can include determining that the event record 1302 matches the pattern if the image filename is no more than the edit-distance threshold away from the reference string. Therefore, image filenames of "exploder.exe" (with a "d") or "explorer.exe" (exp-digit one-orer.exe) correspond with a match, since their edit distance is unity. Similarly, an image filename of "exp1or3r.exe" (with digits one and three) has an edit distance of 2, and so would correspond with a match. However, an image filename of "soffice.bin", having an edit distance of 11, would not correspond with a match. Operation 1304 permits readily detecting attempts by adversaries to conceal malware by using filenames similar to the filenames of trusted files such as operating-system components or commonly-used applications, without increasing the volume of events by providing false detections.

In some examples, the event record 1302 identifies a system component 1310 of the corresponding monitored computing device 104. For example, the event record 1302 can include a hash, UUID, hostname, or other identifier of a computer; a memory address, segment number or descriptor, or other identifier of a region of memory; a process ID, main-image filename, or other identifier of a process; a filename, inode number, or other identifier of a file; or a bus path, vendor/product ID pair, or other identifier of an accessory (e.g., an add-in card, USB device, or other connectible device) or other system component 1310.

In some examples, the pattern set 306 associated with the event type 304 of the event record 114 defines a component criterion 1312. The component criterion 1312 can include any test described herein with respect to patterns or pattern sets 306. For example, the component criterion 1312 can include a regular-expression test, substring test, numerical or range test, or other test or condition.

In some examples using identifications of system components 1310 and using component criteria 1312, at operation 1314, a history subsystem 1316 of the system 800 can determine an ancestor system component 1318 associated with the system component 1310. History subsystem 1316 can represent history subsystem 804. In some examples in which system component 1310 is a process, the ancestor system component 1318 can be or include, e.g., a parent process, grandparent process, or another process in the chain between the startup process and the system component 1310. For example, the ancestor system component 1318 can be or include a shell process, e.g., as identified by the process's name (e.g., cmd.exe or sethc.exe) or a hash of the process's primary module. In some examples in which system component 1310 is a file, the ancestor system component 1318 can be or include, e.g., another folder or file containing or referring to the system component 1310, or a process that created or that most recently wrote to the system component 1310. In some examples, matching module 228, testing module 230, or both, can determine ancestor information, e.g., by requesting that information from an external data source 614 such as an ancestry database.

In some examples, at operation 1320, the matching module 228 or the matching subsystem 806 can determine that the event record 1302 matches the corresponding pattern of the pattern set 306 at least partly based on the ancestor system component 1318 satisfying the component criterion 1312. For example, the component criterion 1312 can include a blacklist indicating forbidden ancestry for the event type 304 of the event record 1302. In some examples in which system component 1310 and ancestor system component 1318 are processes, the component criterion 1312 can be a text criterion (e.g., a regex) applied to an image filename or a command line of the ancestor system component 1318, or a numeric criterion applied to a process ID of the ancestor system component 1318. Additionally or alternatively, in some examples, the testing module 320 or the testing subsystem 822 can determine that the match record 310 matches the condition set 312 or the updated condition set 818 based at least in part on the ancestor system component 1318 satisfying the component criterion 1312. In some of those examples, the component criterion 1312 can be included in condition set 312 instead of or in addition to in the pattern set 306. In some examples, pattern set 306 can include one or more component criteria 1312, or condition set 312 can include one or more component criteria 1312.

In some examples, Web browsers, email clients, and other Internet-communication programs typically do not launch shells (e.g., cmd.exe or /bin/bash). The pattern set 306 can therefore include a component criterion 1312 applied to a system component 1310 that is a shell, as indicated, e.g., by event type 304. The component criterion 1312 can specify the ancestor system component 1318 being an Internet-communication program, e.g., as identified by filename, command-line parameters, hash or contents of the program's primary module, or in other ways described herein. Therefore, when an Internet-communication program executes a shell process, the component criterion 1312 will be satisfied, and a corresponding match record 310 will be provided.

In some examples, other criteria can be used in addition to the component criterion. In some examples, event type 304 can indicate that a process was launched. Pattern set 306 can include a criterion that the launched process is a shell, e.g., as determined by textual or hashing comparisons such as described herein. This criterion can be used together with the component criterion 1312 indicating that the ancestor system component 1318 is an Internet-communication program.

In some examples, on a UNIX-like system, a typical command-line process layout involves init(8) having PID 1, a shell process having a PID p>1 and a parent PID (PPID) of 1, and individual command processes having PIDs greater than 1 and PPID p. In an example, the component criterion 1312 can be that the grandparent process of a chmod(1) process (change file access rights) has PID≠1. The pattern set 306 can further specify that this component criterion 1312 applies to processes having command lines matching the regex /\bchmod\b/. This pattern set 306 and component criterion 1312 will not provide a match record 310 for chmod(1) calls executed interactively in a shell, since the grandparent process for the corresponding processes will be init(8) with PID 1 (thus failing the grandparent PID≠1 requirement of component criterion 1312). This reduces the volume of match records 310 by not flagging users' own interactive chmod(1) use as suspicious. However, if a program other than the top-level shell with PID p (or other processes forked by init(8)) executes a chmod(1) call, the ancestor system component 1318 will have a PID≠1, and so will satisfy the component criterion 1312. Therefore, operation 1320 will cause a match record 310 to be generated indicating that the chmod(1) call represented by event record 1302 is a suspicious event. This permits detecting, e.g., chmod(1) calls executed by malicious code that breaks out of a Web-browser sandbox. For such calls, the grandparent process can be the shell with PID p, and the parent process the Web browser.

EXAMPLE CLAUSES

Various examples include one or more of, including any combination of any number of, the following example features. Throughout these clauses, parenthetical remarks are for example and explanation, and are not limiting. Parenthetical remarks given in this Example Clauses section with respect to specific language apply to corresponding language throughout this section, unless otherwise indicated.

A: A method comprising: detecting a plurality of events, each event occurring at a monitored computing device of a plurality of monitored computing devices and each event having an event type; determining match records associated with respective events of the plurality of events; providing, for each match record satisfying a corresponding condition of a condition set, a respective candidate record comprising a tag associated with the corresponding condition; receiving, via a user interface, a tag criterion; providing, for each candidate record having the respective tag satisfying the tag criterion, a respective result record comprising at least some data of the respective match record; presenting, via a user interface, the respective result records; receiving, via the user interface, a second condition; providing, for each match record satisfying the second condition, a respective second candidate record comprising a tag associated with the second condition; providing, for each second candidate record having the respective tag satisfying the tag criterion, a respective second result record comprising at least some data of the respective match record; and presenting, via the user interface, the respective second result records.

B: The method according to paragraph A, further comprising, before receiving the second condition: receiving, via the user interface, a selection of a selected result record of the result records; populating a condition-builder interface based at least in part on the selected result record; and presenting, via the user interface, the condition-builder interface.

C: The method according to paragraph A or B, further comprising: receiving, via a second user interface different from the user interface, a second tag criterion; providing, for at least one of the second candidate records having the respective tag satisfying the second tag criterion, a respective third result record comprising at least some data of the respective event record; and presenting, via the second user interface, the third result records.

D: The method according to any of paragraphs A-C, further comprising: providing, for one or more of the events having the respective event types included in a match list, respective event records; providing, for each event record matching a corresponding pattern of one or more patterns associated with the respective event type, the respective match record of the match records, the respective match record comprising: an identifier of the corresponding pattern; and at least some data of the respective event record.

E: The method according to any of paragraphs A-D, further comprising: before providing the candidate records: retrieving data from a data source based at least in part on a match record of the match records; and updating the match record to include the data; and determining the respective candidate record associated with the match record based at least in part on the data in the match record satisfying a data criterion of the corresponding condition.

F: The method according to any of paragraphs A-E, further comprising: receiving one or more supplemental records from a data source; and providing, for each supplemental record satisfying a corresponding condition of the condition set, a respective candidate record comprising a tag associated with the corresponding condition.

G: The method according to any of paragraphs A-F, further comprising: providing, in response to a match record of the match records satisfying the corresponding condition, the respective candidate record identifying a notification target; and transmitting, to the notification target, a notification of the respective candidate record.

H: A system, comprising: a computer-readable memory storing a condition set having one or more conditions; a communications interface configured to receive event records of a plurality of events, each event record associated with a monitored computing device and having an event type; a matching subsystem configured to provide, for each event record matching a corresponding pattern of a pattern set associated with the respective event type, a respective match record comprising: an identifier of the corresponding pattern; and at least some data of the respective event record; an updating subsystem configured to: receive, from a user interface, a modification record specifying a modification to a condition; and apply the modification record to the condition set to provide an updated condition set; and a testing subsystem configured to provide, for each match record satisfying a corresponding condition of the updated condition set, a respective candidate record comprising a tag associated with the corresponding condition.

I: The system according to paragraph H, wherein: the matching subsystem comprises a plurality of compiled subroutines corresponding to respective ones of the pattern sets; the matching subsystem is configured to test an event record of the event records against the pattern set associated with the respective event type by executing the respective compiled subroutine of the plurality of compiled subroutines; the updating subsystem comprises a parser configured to parse a textual condition specification in the modification record and provide corresponding modification instructions; and the updating subsystem is configured to apply the modification record at least partly by carrying out the corresponding modification instructions.

J: The system according to paragraph H or I, wherein the testing subsystem is further configured to: determine that a match record of the match records includes a match tag; provide the respective candidate record of the candidate records excluding the match tag, based on the corresponding condition.

K: The system according to any of paragraphs H-J, wherein: the computer-readable memory further stores an identifier set; and the matching subsystem is configured to: determine that an event record of the event records comprises an identifier listed in the identifier set; and provide the respective match record of the match records comprising a second tag, wherein the second tag is associated with the identifier.

L: The system according to any of paragraphs H-K, wherein: an event record of the first event records identifies a system component of the corresponding monitored computing device; the pattern set associated with the indication defines a component criterion; the system further comprises a history subsystem configured to determine an ancestor system component associated with the system component; and the matching subsystem is configured to determine that the event record matches the corresponding pattern at least partly based at least in part on the ancestor system component satisfying the component criterion.

M: The system according to any of paragraphs H-L, wherein: an event record of the event records comprises text data; the pattern set associated with the event type of the event record defines a text criterion; and the matching subsystem is configured to determine that the event record matches the corresponding pattern at least partly based at least in part on the text data satisfying the text criterion.

N: The system according to claim M, further comprising: transforming the text data to provide transformed text data; and determining that the text data satisfies the text criterion in response to the transformed text data satisfying the text criterion.

O: The system according to any of paragraphs H-N, wherein the testing subsystem is further configured to: provide, for a first match record of the respective match records, a first candidate record, wherein the first match record satisfies a corresponding second condition of the condition set; and subsequent to receiving the modification record, add, remove, or modify at least one tag of the first candidate record based at least in part on at least one of the modification record or the updated condition set.

P: A method comprising: receiving event records of a plurality of events, each event record associated with a monitored computing device and having an event type; providing, for each event record matching a corresponding pattern of a pattern set associated with the respective event type, a respective match record comprising: an identifier of the corresponding pattern; and at least some data of the respective event record; and providing, for each match record satisfying a corresponding condition of a condition set, a respective candidate record comprising a tag associated with the corresponding condition.

Q: The method according to paragraph P, further comprising: receiving, via a user interface, a modification record specifying a modification to a condition; applying the modification record to the condition set to provide an updated condition set; and providing, for each match record satisfying a corresponding second condition of the updated condition set, a respective second candidate record comprising a tag associated with the corresponding second condition.

R: The method according to paragraph Q, further comprising: providing, for a first match record of the respective match records, a first candidate record, wherein the first match record satisfies a corresponding second condition of the condition set; and subsequent to receiving the modification record, adding, removing, or modifying at least one tag of the first candidate record based at least in part on at least one of the modification record or the updated condition set.

S: The method according to any of paragraphs P-R, further comprising: determining that an event record of the event records comprises an identifier listed in an identifier set; and providing the respective match record of the match records comprising a second tag, wherein the second tag is associated with the identifier.

T: The method according to any of paragraphs P-S, wherein: an event record of the event records identifies a system component of the corresponding monitored computing device; the pattern set associated with the event type of the event record defines a component criterion; and the method further comprises: determining an ancestor system component associated with the system component; and determining that the event record matches the corresponding pattern of the pattern set at least partly based on the ancestor system component satisfying the component criterion.

U: The method according to any of paragraphs P-T, wherein: an event record of the event records comprises text data; the pattern set associated with the event type of the event record defines a text criterion; and the method further comprises determining that the event record matches the corresponding pattern of the pattern set at least partly based on the text data satisfying the text criterion.

V: A computer-readable medium, e.g., a computer storage medium, having thereon computer-executable instructions, the computer-executable instructions upon execution configuring a computer to perform operations as any of paragraphs A-G, H-O, or P-U recites.

W: A device comprising: a processor; and a computer-readable medium, e.g., a computer storage medium, having thereon computer-executable instructions, the computer-executable instructions upon execution by the processor configuring the device to perform operations as any of paragraphs A-G, H-O, or P-U recites.

X: A system comprising: means for processing; and means for storing having thereon computer-executable instructions, the computer-executable instructions including means to configure the system to carry out a method as any of paragraphs A-G, H-O, or P-U recites.

CONCLUSION

Various techniques described herein can permit detecting events 302 that have taken place or are taking place at monitored computing devices 104, e.g., reads from or writes to files, creation or termination of processes, setup or teardown of, or data transfer during, network communications, or other events. Some examples permit discarding non-suspicious events at early stages of a processing pipeline such as that shown in FIG. 3. This can permit filtering and classifying events 302 so that entities 112, e.g., security analysts, can readily locate suspicious events, without the computational, data-storage, and data-transfer burdens of handling thousands of events per second throughout the entire pipeline.

Some examples are described with reference to malware and attack detection, but techniques described herein are not limited to security-relevant event streams. For example, techniques used herein can be used to handle events associated with system performance, troubleshooting, data distribution, or other technologies.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

Although some features and examples herein have been described in language specific to structural features or methodological steps, it is to be understood that the appended claims are not necessarily limited to the specific features or steps described herein. Rather, the specific features and steps are disclosed as preferred forms of implementing the claimed invention. For example, computing devices 102 or 104, network 110, processing unit(s) 210, or other structures described herein for which multiple types of implementing devices or structures are listed can include any of the listed types, or multiples or combinations thereof.

Moreover, this disclosure is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s).

Some operations of example processes or devices herein are illustrated in individual blocks and logical flows thereof, and are summarized with reference to those blocks. The order in which the operations are described is not intended to be construed as a limitation unless otherwise indicated. Any number of the described operations can be executed in any order, combined in any order, subdivided into multiple sub-operations, or executed in parallel to implement the described processes. For example, in alternative implementations included within the scope of the examples described herein, elements or functions can be deleted, or executed out of order from that shown or discussed, including substantially synchronously or in reverse order. In some examples, combinations of the described functions can be performed in batch, in a streamed or pipelined manner, or in any combination of batch, stream, and pipelined processing.

Each illustrated block can represent one or more operations that can be implemented in hardware, software, or a combination thereof. In the context of software, the operations described herein represent computer-executable instructions stored on at least one computer-readable medium (e.g., computer storage medium) that, when executed by one or more processors, cause or enable the one or more processors to perform the recited operations. Generally, computer-executable instructions include routines, programs, objects, modules, code segments, components, data structures, and the like that perform particular functions or implement particular abstract data types.

Accordingly, the methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality or similar functionality can be arranged differently (e.g., combined into a smaller number of modules, broken into a larger number of modules, etc.). In some instances, the functionality or modules discussed herein may be implemented as part of a computer operating system 220. In other instances, the functionality or modules may be implemented as part of a device driver, firmware, application, or other software subsystem.

Example computer-implemented operations described herein can additionally or alternatively be embodied in specialized computer hardware. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system." The described processes can be performed by resources associated with one or more computing device(s) 102, 104, 106, or 200, such as one or more internal or external CPUs or GPUs, or one or more pieces of hardware logic such as FPGAs, DSPs, or other types of accelerators.

What is claimed is:

1. A method comprising:
    detecting, at a monitored computing device of a plurality of monitored computing devices, a plurality of events, wherein individual events of the plurality of events are associated with an event type, and the event type is associated with a pattern set;
    determining match records associated with the individual events of the plurality of events based at least in part on matching at least one pattern of the pattern set with the individual events;
    providing, for each match record of the match records satisfying a corresponding condition of a condition set, a respective candidate record of candidate records comprising a respective first tag associated with the corresponding condition;
    receiving, via a user interface, a tag criterion;
    providing, for each candidate record of the candidate records having the respective first tag satisfying the tag criterion, a respective result record of result records comprising at least some data of the respective match record;
    presenting, via the user interface, the result records;
    receiving, via the user interface, a second condition;
    providing, for each second match record satisfying the second condition, a respective second candidate record of second candidate records comprising a second respective tag associated with the second condition;
    providing, for each second candidate record of the second candidate records having the second respective tag satisfying the tag criterion, a respective second result record of second result records comprising at least some data of the respective second match record; and
    presenting, via the user interface, the second result records.

2. The method according to claim 1, further comprising, before receiving the second condition:
    receiving, via the user interface, a selection of a selected result record of the result records;
    populating a condition-builder interface based at least in part on the selected result record; and
    presenting, via the user interface, the condition-builder interface.

3. The method according to claim 1, further comprising:
    receiving, via a second user interface different from the user interface, a second tag criterion;
    providing, for at least one of the second candidate records having the second respective tag satisfying the second tag criterion, a respective third result record comprising at least some data of the respective event record; and
    presenting, via the second user interface, the third result records.

4. The method according to claim 1, further comprising:
    providing, for one or more events of the plurality of events associated with one or more event types included in a match list, respective event records, wherein the match list includes event types associated with chains of execution activities detected on the monitored computing device; and
    providing, for each event record matching a corresponding pattern of one or more patterns associated with the respective event type, the respective match record of the match records, the respective match record comprising:

an identifier of the corresponding pattern, and
at least some data of the respective event record.

5. The method according to claim 1, further comprising:
before providing the candidate records:
retrieving data from a data source based at least in part on a match record of the match records;
updating the match record to include the data; and
determining the respective candidate record associated with the match record based at least in part on the data in the match record satisfying a data criterion of the corresponding condition.

6. The method according to claim 1, further comprising:
receiving one or more supplemental records from a data source; and
providing, for each supplemental record satisfying a corresponding condition of the condition set, a respective candidate record comprising a tag associated with the corresponding condition.

7. The method according to claim 1, further comprising:
providing, in response to a match record of the match records satisfying the corresponding condition, the respective candidate record identifying a notification target; and
transmitting, to the notification target, a notification of the respective candidate record.

8. A system, comprising:
a computer-readable memory storing a condition set having one or more conditions;
a communications interface configured to receive event records of a plurality of events, an individual event record of the event records associated with a monitored computing device and associated with an event type;
a matching subsystem configured to:
access a pattern set associated with the event type; and
provide, for the individual event record matching a corresponding pattern of the pattern set, a match record comprising an identifier of the corresponding pattern, and at least some data of the individual event record;
an updating subsystem configured to:
receive, from a user interface, a modification record specifying a modification to a condition; and
apply the modification record to the condition set to provide an updated condition set; and
a testing subsystem configured to provide, for the match record satisfying a corresponding condition of the updated condition set, a respective candidate record comprising a tag associated with the corresponding condition.

9. The system according to claim 8, wherein:
the matching subsystem comprises a plurality of compiled subroutines corresponding to respective ones of the pattern sets;
the matching subsystem is further configured to test an event record of the event records against the pattern set associated with the respective event type by executing the respective compiled subroutine of the plurality of compiled subroutines;
the updating subsystem comprises a parser configured to parse a textual condition specification in the modification record and provide corresponding modification instructions; and
the updating subsystem is further configured to apply the modification record at least partly by carrying out the corresponding modification instructions.

10. The system according to claim 8, wherein the testing subsystem is further configured to:
determine that the match record of match records includes a match tag; and
provide the respective candidate record of candidate records excluding the match tag, based on the corresponding condition.

11. The system according to claim 8, wherein:
the computer-readable memory further stores an identifier set; and
the matching subsystem is further configured to:
determine that an event record of the event records comprises an identifier listed in the identifier set; and
provide the respective match record of the match records comprising a second tag, wherein the second tag is associated with the identifier.

12. The system according to claim 8, wherein:
an event record of the event records identifies a system component of the corresponding monitored computing device;
the pattern set associated with an indication defines a component criterion;
the system further comprises a history subsystem configured to determine an ancestor system component associated with the system component; and
the matching subsystem is configured to determine that the event record matches the corresponding pattern at least partly based at least in part on the ancestor system component satisfying the component criterion.

13. The system according to claim 8, wherein:
an event record of the event records comprises text data;
the pattern set associated with the event type of the event record defines a text criterion; and
the matching subsystem is configured to determine that the event record matches the corresponding pattern at least partly based at least in part on the text data satisfying the text criterion.

14. The system according to claim 8, wherein the testing subsystem is further configured to:
provide, for a first match record of the respective match records, a first candidate record, wherein the first match record satisfies a corresponding second condition of the condition set; and
subsequent to receiving the modification record, add, remove, or modify at least one tag of the first candidate record based at least in part on at least one of the modification record or the updated condition set.

15. A method comprising:
receiving event records of a plurality of events, an event record of the event records associated with a monitored computing device and an event type;
accessing a pattern set associated with the event type;
providing, based on the event record matching a corresponding pattern of the pattern set, a match record of match records comprising:
an identifier of the corresponding pattern, and
at least some data of the event record; and
providing, for the match record satisfying a corresponding condition of a condition set, a candidate record comprising a tag associated with the corresponding condition.

16. The method according to claim 15, further comprising:
receiving, via a user interface, a modification record specifying a modification to a condition;
applying the modification record to the condition set to provide an updated condition set; and
providing, for the match record satisfying a corresponding second condition of the updated condition set, a second candidate record comprising a tag associated with the corresponding second condition.

17. The method according to claim 16, further comprising:
    providing, for a first match record of the match records, a first candidate record, wherein the first match record satisfies a corresponding second condition of the condition set; and
    subsequent to receiving the modification record, adding, removing, or modifying at least one tag of the first candidate record based at least in part on at least one of the modification record or the updated condition set.

18. The method according to claim 15, further comprising:
    determining that the event record comprises the identifier listed in an identifier set; and
    providing the match record comprising a second tag, wherein the second tag is associated with the identifier.

19. The method according to claim 15, wherein:
    the event record identifies a system component of the corresponding monitored computing device;
    the pattern set associated with the event type of the event record defines a component criterion; and
    the method further comprises:
    determining an ancestor system component associated with the system component; and
    determining that the event record matches the corresponding pattern of the pattern set based at least in part on the ancestor system component satisfying the component criterion.

20. The method according to claim 15, wherein:
    the event record comprises text data;
    the pattern set associated with the event type of the event record defines a text criterion; and
    the method further comprises determining that the event record matches the corresponding pattern of the pattern set based at least in part on the text data satisfying the text criterion.

* * * * *